(12) United States Patent
Francini et al.

(10) Patent No.: US 11,463,370 B2
(45) Date of Patent: Oct. 4, 2022

(54) SCALABLE DETERMINISTIC SERVICES IN PACKET NETWORKS

(71) Applicant: Nokia Solutions and Networks Oy, Espoo (FI)

(72) Inventors: Andrea Francini, New Providence, NJ (US); Raymond Miller, Mt. Arlington, NJ (US); Sameerkumar Sharma, Holmdel, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/788,765

(22) Filed: Feb. 12, 2020

(65) Prior Publication Data
US 2021/0250301 A1 Aug. 12, 2021

(51) Int. Cl.
*H04L 47/32* (2022.01)
*H04L 43/0811* (2022.01)
*H04L 47/2441* (2022.01)
*H04L 43/106* (2022.01)
*H04L 47/56* (2022.01)

(52) U.S. Cl.
CPC .......... *H04L 47/32* (2013.01); *H04L 43/0811* (2013.01); *H04L 43/106* (2013.01); *H04L 47/2441* (2013.01); *H04L 47/56* (2013.01)

(58) Field of Classification Search
CPC . H04L 47/32; H04L 43/0811; H04L 47/2441; H04L 47/56; H04L 43/106
See application file for complete search history.

(56) References Cited

U.S. PATENT DOCUMENTS 6,396,843 B1 * 5/2002 Chiussi ................. H04L 47/28
370/389
6,438,134 B1 * 8/2002 Chow ................. H04L 12/5602
370/230

(Continued)

FOREIGN PATENT DOCUMENTS

WO   WO 2018/166576 A1   9/2018

OTHER PUBLICATIONS

Joung, J., "Regulating Scheduler (RSC): A Novel Solution for IEEE 802.1 Time Sensitive Network (TSN)," Electronics 2019, 8(2), 189; Feb. 6, 2019, 28 pages.

(Continued)

*Primary Examiner* — Eunsook Choi
(74) *Attorney, Agent, or Firm* — Tong, Rea, Bentley & Kim, LLC

(57) ABSTRACT

Various example embodiments for supporting scalable deterministic services in packet networks are presented. Various example embodiments for supporting scalable deterministic services in packet networks may be configured to support delay guarantees (e.g., finite end-to-end delay bounds) for a class of traffic flows referred to as guaranteed-delay (GD) traffic flows. Various example embodiments for supporting scalable deterministic services in packet networks may be configured to support delay guarantees for GD traffic flows of a network based on a queuing arrangement that is based on network outputs of the network, a packet scheduling method that is configured to support scheduling of packets of the GD traffic flows, and a service rate allocation rule configured to support delay guarantees for the GD traffic flows.

20 Claims, 8 Drawing Sheets

(56) References Cited

U.S. PATENT DOCUMENTS

| | | | |
|---|---|---|---|
| 7,792,131 B1* | 9/2010 | Ma | H04L 47/215 370/412 |
| 10,412,018 B1* | 9/2019 | Feng | H04L 49/1546 |
| 2002/0036984 A1* | 3/2002 | Chiussi | H04L 12/5602 370/232 |
| 2003/0050954 A1* | 3/2003 | Tayyar | H04L 47/623 718/102 |
| 2004/0081164 A1* | 4/2004 | Hassan-Ali | H04L 49/3081 370/395.21 |
| 2004/0085964 A1* | 5/2004 | Vaananen | H04L 47/2433 370/395.4 |
| 2005/0177644 A1* | 8/2005 | Basso | H04L 49/90 709/232 |
| 2010/0162337 A1* | 6/2010 | Lee | H04L 47/2483 725/111 |
| 2019/0121781 A1 | 4/2019 | Kasichainula | |
| 2019/0289616 A1 | 9/2019 | Hampel et al. | |

OTHER PUBLICATIONS

Nasrallah, A., et al., "TSN Algorithms for Large Scale Networks: A Survey and Conceptual Comparison," arXiv:1905.08478v2 [cs.NI], Jun. 19, 2019, 14 pages.

Mohammadpour, E., et al., "End-to-End Latency and Backlog Bounds in Time-Sensitive Networking with Credit Based Shapers and Asynchronous Traffic Shaping," arXiv:1804310608v1, Apr. 27, 2018, 10 pages.

Wrocklawski, J., "The Use of RSVP with IETF Integrated Services," Network Working Group, RFC 2210, Sep. 1997, 33 pages.

Boiger, C., "Class A Bridge Latency Calculations," IEEE 802 Plenary Meeting, Nov. 2010, 26 pages.

Finn, N., et al., "DetNet bounded Latency," Internet Engineering Task Force (IETF), draft-ietf-detnet-bounded-latency-00, Internet Draft, Jul. 24, 2019, 27 pages.

Grossman, E., "Deterministic Networking Use Cases," Internet Engineering Task Force (IETF), RFC 8572, May 2019, 97 pages.

Braden, R., et al., "Resource Reservation Protocol (RSVP)," Version 1 Functional Specification, Network Working Group, RFC 2205, Sep. 1997, 112 pages.

Blake, S., et al., "An Architecture for Differentiated Service," Network Working Group, RFC 2475, Dec. 1998, 36 pages.

Rosen, E., et al., "Multiprotocol Label Switching Architecture," Network Working Group, RFC 3031, Jan. 2001, 61 pages.

Mannie, E., "Generalized Multi-Protocol Label Switching (GMPLS) Architecture," Network Working Group, RFC 3945, Oct. 2004, 69 pages.

Filsfils, C., et al., "Segment Routing Architecture," Internet Engineering Task Force (IETF), RFC 8402, Jul. 2018, 32 pages.

Finn, N., et al., "Deterministic Networking Architecture," draft-ietf-detnet-archtecture-13, DetNet, May 6, 2019, 45 pages.

IEEE, "IEEE Standard for Local and Metropolitan Area Networks, Bridges and Bridged Networks, Amendment 25: Enhancements for Scheduled Traffic," IEEE Standard 802.1Qbv, 2015, 57 pages.

IEEE, "IEEE Standard for Local and Metropolitan Area Networks, Virtual Bridged Local Area Networks, Amendment 12: Forwarding and Queuing Enhancements for Time-Sensitive Streams," IEEE Standard 802.1Qav, 2009, 87 pages.

IEEE, "Draft Standard for Local and Metropolitan Area Networks, Bridges and Bridged Networks, Amendment: Asynchronous Traffic Shaping," IEEE Standard P802.1Qcr, Oct. 20, 2017, 46 pages.

Stiliadis, D., et al., "Rate-Proportional Servers: A Design Methodology for Fair Queueing Algorithms," IEEE/ACM Transactions on Networking, vol. 6, No. 2, Apr. 1998, pp. 164-174.

Stiliadis, D., et al., "Latency-Rate Servers: A General Model for Analysis of Traffic Scheduling Algorithms," Proceedings of IEEE INFOCOM 1996, Mar. 1996, pp. 111-119.

Stephens, D.C., et al., "Implementing Scheduling Algorithms in High-Speed Networks," IEEE Journal on Selected Areas in Communications, vol. 17, No. 6, Jun. 1999, pp. 1145-1158.

Stiliadis, D., et al., "A General Methodology for Designing Efficient Traffic Scheduling and Shaping Algorithms," Proceedings of IEEE INFOCOM 1997, Apr. 1997, pp. 326-335.

Francini, A, et al., "Minimum-Latency Dual-Leaky-Bucket Shapers for Packet Multiplexers: Theory and Implementation," Proceedings of IEEE/ACM IWQoS 2000, Jun. 2000, pp. 19-28.

IEEE, "IEEE Standard for Local and Metropolitan Area Networks, Bridges and Bridged Networks," IEEE Standard 802.1Q, IEEE Computer Society, 2018, 1993 pages.

* cited by examiner

| MAX PACKET SIZE | CBS+IR, 40 Mb/s | SDS-IDB | SDS-EDB |
|---|---|---|---|
| 1 KB | 0.575 | 0.390 | 0.240 |
| 2 KB | 0.700 | 0.580 | 0.280 |
| 3 KB | 0.825 | 0.770 | 0.320 |
| 4 KB | 0.950 | 0.960 | 0.360 |
| 5 KB | 1.075 | 1.150 | 0.400 |
| 6 KB | 1.200 | 1.340 | 0.440 |
| 7 KB | 1.325 | 1.530 | 0.480 |
| 8 KB | 1.450 | 1.720 | 0.520 |
| 9 KB | 1.575 | 1.910 | 0.560 |
| 10 KB | 1.700 | 2.100 | 0.600 |

SCALABLE DETERMINISTIC SERVICES IN PACKET NETWORKS

TECHNICAL FIELD

Various example embodiments relate generally to communication systems, more particularly but not exclusively, to supporting scalable deterministic services in packet networks.

BACKGROUND

Packet networks may support communication of packets in various ways. For example, packet networks may support communication of packets based on various packet queuing techniques, such as based on use of various packet classification schemes, various types of packet queues, various types of packet schedulers, and the like. Various aspects of packet queuing may be modified under various conditions to support queuing of packets in packet networks.

SUMMARY

In at least some example embodiments, an apparatus includes at least one processor and at least one memory including a set of instructions, wherein the set of instructions is configured to, when executed by the at least one processor, cause the apparatus to receive, by a network node of a network including a set of network outputs, a set of packets of a set of guaranteed delay traffic flows, wherein each of the guaranteed delay traffic flows is associated with a respective one of network outputs of the network, queue, by the network node based on a set of guaranteed delay flow aggregates associated with the respective set of network outputs and based on association of the guaranteed delay traffic flows with the respective network outputs, the packets of the guaranteed delay traffic flows, and control, at the network node based on servicing of the set of guaranteed delay flow aggregates by a scheduler, transmission of the packets of the guaranteed delay traffic flows from the network node. In at least some example embodiments, the set of network outputs of the network comprises at least one of a port interfacing with a host device or a port interfacing with a network device located outside of the network. In at least some example embodiments, each of the guaranteed delay flow aggregates has associated therewith a respective service rate, wherein the transmission of the packets of the guaranteed delay traffic flows from the network node is controlled based on the respective service rates associated with the respective guaranteed delay flow aggregates. In at least some example embodiments, for each of the guaranteed delay flow aggregates, the respective service rate is at least as large as a sum of a set of service rates allocated to a respective set of guaranteed delay flow aggregates associated with the respective network output at a respective set of network nodes preceding the network node in a network path to the respective network output. In at least some example embodiments, each of the guaranteed delay flow aggregates has associated therewith a respective timestamp, wherein the transmission of the packets of the guaranteed delay traffic flows from the network node is controlled based on the respective timestamps associated with the respective guaranteed delay flow aggregates. In at least some example embodiments, for each of the guaranteed delay flow aggregates, the respective timestamp is associated with one of the packets of one of the guaranteed delay traffic flows associated with the respective guaranteed delay flow aggregate and is computed based on at least one of a local time at the network node, a timestamp of a previously arrived packet of the respective guaranteed delay flow aggregate, a size of the packet of the one of the guaranteed delay traffic flows, or a service rate allocated to the guaranteed delay flow aggregate. In at least some example embodiments, the transmission of the packets of the guaranteed delay traffic flows from the network node is controlled based on a set of guaranteed delay queues associated with the respective guaranteed delay flow aggregates. In at least some example embodiments, the transmission of the packets of the guaranteed delay traffic flows from the network node is controlled based on a set of timestamps associated with the respective guaranteed delay queues. In at least some example embodiments, for at least one of the timestamps, the timestamp is a per-packet timestamp associated with one of the packets, wherein the per-packet timestamp is determined for the one of the packets based on arrival of the one of the packets to the respective guaranteed delay queue and is associated with the respective guaranteed delay queue based on the one of the packets becoming a head packet of the respective guaranteed delay queue. In at least some example embodiments, the per-packet timestamp is computed based on a timestamp of a previous tail packet of the respective guaranteed delay queue, a size of the one of the packets, and a service rate of the respective guaranteed delay queue. In at least some example embodiments, for at least one of the timestamps, the timestamp is a per-queue timestamp associated with the respective guaranteed delay queue, wherein the per-queue timestamp is determined for the respective guaranteed delay queue based on one of the packets reaching a respective head position of the respective guaranteed delay queue. In at least some example embodiments, the per-queue timestamp is computed based on a previous per-queue timestamp associated with the respective guaranteed delay queue, a size of the one of the packets, and a service rate of the respective guaranteed delay queue. In at least some example embodiments, to control transmission of the packets of the guaranteed delay traffic flows from the network node, the set of instruction is configured to, when executed by the at least one processor, cause the apparatus to at least select one of the guaranteed delay queues for which the respective timestamp is a lowest timestamp satisfying an eligibility condition. In at least some example embodiments, the eligibility condition is based on a size of a head packet of the one of the guaranteed delay queues, a service rate allocated to the respective guaranteed delay flow aggregate of the one of the guaranteed delay queues, and the respective timestamp associated with the one of the guaranteed delay queues. In at least some example embodiments, the transmission of the packets of the guaranteed delay traffic flows from the network node is controlled based on a guaranteed delay queue associated with the guaranteed delay flow aggregates. In at least some example embodiments, the transmission of the packets of the guaranteed delay traffic flows from the network node is controlled based on a set of timestamps associated with the respective packets of the guaranteed delay traffic flows. In at least some example embodiments, for at least one of the packets, the respective timestamp for the packet is determined based on at least one of a timestamp of a previously arrived packet of one of the guaranteed delay flow aggregates with which the packet is associated, a size of the packet, or a service rate of the one of the guaranteed delay flow aggregates with which the packet is associated. In at least some example embodiments, to control transmission of the packets of the guaranteed delay traffic flows from the network node, the set of instructions is configured to, when executed by the at least one processor, cause the apparatus to at least select one of the packets of the guaranteed delay traffic flows for which the respective timestamp is a lowest timestamp satisfying an eligibility condition. In at least some example embodiments, the eligibility condition is based on a size of the one of the packets, a service rate allocated to the respective guaranteed delay flow aggregate of the respective guaranteed delay flow of the one of the packets, and the respective timestamp associated with the packet.

In at least some example embodiments, a non-transitory computer-readable medium stores a set of instructions configured to cause an apparatus to receive, by a network node of a network including a set of network outputs, a set of packets of a set of guaranteed delay traffic flows, wherein each of the guaranteed delay traffic flows is associated with a respective one of network outputs of the network, queue, by the network node based on a set of guaranteed delay flow aggregates associated with the respective set of network outputs and based on association of the guaranteed delay traffic flows with the respective network outputs, the packets of the guaranteed delay traffic flows, and control, at the network node based on servicing of the set of guaranteed delay flow aggregates by a scheduler, transmission of the packets of the guaranteed delay traffic flows from the network node. In at least some example embodiments, the set of network outputs of the network comprises at least one of a port interfacing with a host device or a port interfacing with a network device located outside of the network. In at least some example embodiments, each of the guaranteed delay flow aggregates has associated therewith a respective service rate, wherein the transmission of the packets of the guaranteed delay traffic flows from the network node is controlled based on the respective service rates associated with the respective guaranteed delay flow aggregates. In at least some example embodiments, for each of the guaranteed delay flow aggregates, the respective service rate is at least as large as a sum of a set of service rates allocated to a respective set of guaranteed delay flow aggregates associated with the respective network output at a respective set of network nodes preceding the network node in a network path to the respective network output. In at least some example embodiments, each of the guaranteed delay flow aggregates has associated therewith a respective timestamp, wherein the transmission of the packets of the guaranteed delay traffic flows from the network node is controlled based on the respective timestamps associated with the respective guaranteed delay flow aggregates. In at least some example embodiments, for each of the guaranteed delay flow aggregates, the respective timestamp is associated with one of the packets of one of the guaranteed delay traffic flows associated with the respective guaranteed delay flow aggregate and is computed based on at least one of a local time at the network node, a timestamp of a previously arrived packet of the respective guaranteed delay flow aggregate, a size of the packet of the one of the guaranteed delay traffic flows, or a service rate allocated to the guaranteed delay flow aggregate. In at least some example embodiments, the transmission of the packets of the guaranteed delay traffic flows from the network node is controlled based on a set of guaranteed delay queues associated with the respective guaranteed delay flow aggregates. In at least some example embodiments, the transmission of the packets of the guaranteed delay traffic flows from the network node is controlled based on a set of timestamps associated with the respective guaranteed delay queues. In at least some example embodiments, for at least one of the timestamps, the timestamp is a per-packet timestamp associated with one of the packets, wherein the per-packet timestamp is determined for the one of the packets based on arrival of the one of the packets to the respective guaranteed delay queue and is associated with the respective guaranteed delay queue based on the one of the packets becoming a head packet of the respective guaranteed delay queue. In at least some example embodiments, the per-packet timestamp is computed based on a timestamp of a previous tail packet of the respective guaranteed delay queue, a size of the one of the packets, and a service rate of the respective guaranteed delay queue. In at least some example embodiments, for at least one of the timestamps, the timestamp is a per-queue timestamp associated with the respective guaranteed delay queue, wherein the per-queue timestamp is determined for the respective guaranteed delay queue based on one of the packets reaching a respective head position of the respective guaranteed delay queue. In at least some example embodiments, the per-queue timestamp is computed based on a previous per-queue timestamp associated with the respective guaranteed delay queue, a size of the one of the packets, and a service rate of the respective guaranteed delay queue. In at least some example embodiments, to control transmission of the packets of the guaranteed delay traffic flows from the network node, the set of instructions is configured to cause the apparatus to at least one processor, cause the apparatus to at least select one of the guaranteed delay queues for which the respective timestamp is a lowest timestamp satisfying an eligibility condition. In at least some example embodiments, the eligibility condition is based on a size of a head packet of the one of the guaranteed delay queues, a service rate allocated to the respective guaranteed delay flow aggregate of the one of the guaranteed delay queues, and the respective timestamp associated with the one of the guaranteed delay queues. In at least some example embodiments, the transmission of the packets of the guaranteed delay traffic flows from the network node is controlled based on a guaranteed delay queue associated with the guaranteed delay flow aggregates. In at least some example embodiments, the transmission of the packets of the guaranteed delay traffic flows from the network node is controlled based on a set of timestamps associated with the respective packets of the guaranteed delay traffic flows. In at least some example embodiments, for at least one of the packets, the respective timestamp for the packet is determined based on at least one of a timestamp of a previously arrived packet of one of the guaranteed delay flow aggregates with which the packet is associated, a size of the packet, or a service rate of the one of the guaranteed delay flow aggregates with which the packet is associated. In at least some example embodiments, to control transmission of the packets of the guaranteed delay traffic flows from the network node, the set of instructions is configured to cause the apparatus to at least select one of the packets of the guaranteed delay traffic flows for which the respective timestamp is a lowest timestamp satisfying an eligibility condition. In at least some example embodiments, the eligibility condition is based on a size of the one of the packets, a service rate allocated to the respective guaranteed delay flow aggregate of the respective guaranteed delay flow of the one of the packets, and the respective timestamp associated with the packet.

In at least some example embodiments, a method includes receiving, by a network node of a network including a set of network outputs, a set of packets of a set of guaranteed delay traffic flows, wherein each of the guaranteed delay traffic flows is associated with a respective one of network outputs of the network, queuing, by the network node based on a set of guaranteed delay flow aggregates associated with the respective set of network outputs and based on association of the guaranteed delay traffic flows with the respective network outputs, the packets of the guaranteed delay traffic flows, and controlling, at the network node based on servicing of the set of guaranteed delay flow aggregates by a scheduler, transmission of the packets of the guaranteed delay traffic flows from the network node. In at least some example embodiments, the set of network outputs of the network comprises at least one of a port interfacing with a host device or a port interfacing with a network device located outside of the network. In at least some example embodiments, each of the guaranteed delay flow aggregates has associated therewith a respective service rate, wherein the transmission of the packets of the guaranteed delay traffic flows from the network node is controlled based on the respective service rates associated with the respective guaranteed delay flow aggregates. In at least some example embodiments, for each of the guaranteed delay flow aggregates, the respective service rate is at least as large as a sum of a set of service rates allocated to a respective set of guaranteed delay flow aggregates associated with the respective network output at a respective set of network nodes preceding the network node in a network path to the respective network output. In at least some example embodiments, each of the guaranteed delay flow aggregates has associated therewith a respective timestamp, wherein the transmission of the packets of the guaranteed delay traffic flows from the network node is controlled based on the respective timestamps associated with the respective guaranteed delay flow aggregates. In at least some example embodiments, for each of the guaranteed delay flow aggregates, the respective timestamp is associated with one of the packets of one of the guaranteed delay traffic flows associated with the respective guaranteed delay flow aggregate and is computed based on at least one of a local time at the network node, a timestamp of a previously arrived packet of the respective guaranteed delay flow aggregate, a size of the packet of the one of the guaranteed delay traffic flows, or a service rate allocated to the guaranteed delay flow aggregate. In at least some example embodiments, the transmission of the packets of the guaranteed delay traffic flows from the network node is controlled based on a set of guaranteed delay queues associated with the respective guaranteed delay flow aggregates. In at least some example embodiments, the transmission of the packets of the guaranteed delay traffic flows from the network node is controlled based on a set of timestamps associated with the respective guaranteed delay queues. In at least some example embodiments, for at least one of the timestamps, the timestamp is a per-packet timestamp associated with one of the packets, wherein the per-packet timestamp is determined for the one of the packets based on arrival of the one of the packets to the respective guaranteed delay queue and is associated with the respective guaranteed delay queue based on the one of the packets becoming a head packet of the respective guaranteed delay queue. In at least some example embodiments, the per-packet timestamp is computed based on a timestamp of a previous tail packet of the respective guaranteed delay queue, a size of the one of the packets, and a service rate of the respective guaranteed delay queue. In at least some example embodiments, for at least one of the timestamps, the timestamp is a per-queue timestamp associated with the respective guaranteed delay queue, wherein the per-queue timestamp is determined for the respective guaranteed delay queue based on one of the packets reaching a respective head position of the respective guaranteed delay queue. In at least some example embodiments, the per-queue timestamp is computed based on a previous per-queue timestamp associated with the respective guaranteed delay queue, a size of the one of the packets, and a service rate of the respective guaranteed delay queue. In at least some example embodiments, controlling transmission of the packets of the guaranteed delay traffic flows from the network node includes selecting one of the guaranteed delay queues for which the respective timestamp is a lowest timestamp satisfying an eligibility condition. In at least some example embodiments, the eligibility condition is based on a size of a head packet of the one of the guaranteed delay queues, a service rate allocated to the respective guaranteed delay flow aggregate of the one of the guaranteed delay queues, and the respective timestamp associated with the one of the guaranteed delay queues. In at least some example embodiments, the transmission of the packets of the guaranteed delay traffic flows from the network node is controlled based on a guaranteed delay queue associated with the guaranteed delay flow aggregates. In at least some example embodiments, the transmission of the packets of the guaranteed delay traffic flows from the network node is controlled based on a set of timestamps associated with the respective packets of the guaranteed delay traffic flows. In at least some example embodiments, for at least one of the packets, the respective timestamp for the packet is determined based on at least one of a timestamp of a previously arrived packet of one of the guaranteed delay flow aggregates with which the packet is associated, a size of the packet, or a service rate of the one of the guaranteed delay flow aggregates with which the packet is associated. In at least some example embodiments, controlling transmission of the packets of the guaranteed delay traffic flows from the network node includes selecting one of the packets of the guaranteed delay traffic flows for which the respective timestamp is a lowest timestamp satisfying an eligibility condition. In at least some example embodiments, the eligibility condition is based on a size of the one of the packets, a service rate allocated to the respective guaranteed delay flow aggregate of the respective guaranteed delay flow of the one of the packets, and the respective timestamp associated with the packet.

In at least some example embodiments, an apparatus includes means for receiving, by a network node of a network including a set of network outputs, a set of packets of a set of guaranteed delay traffic flows, wherein each of the guaranteed delay traffic flows is associated with a respective one of network outputs of the network, means for queuing, by the network node based on a set of guaranteed delay flow aggregates associated with the respective set of network outputs and based on association of the guaranteed delay traffic flows with the respective network outputs, the packets of the guaranteed delay traffic flows, and means for controlling, at the network node based on servicing of the set of guaranteed delay flow aggregates by a scheduler, transmission of the packets of the guaranteed delay traffic flows from the network node. In at least some example embodiments, the set of network outputs of the network comprises at least one of a port interfacing with a host device or a port interfacing with a network device located outside of the network. In at least some example embodiments, each of the guaranteed delay flow aggregates has associated therewith a respective service rate, wherein the transmission of the packets of the guaranteed delay traffic flows from the network node is controlled based on the respective service rates associated with the respective guaranteed delay flow aggregates. In at least some example embodiments, for each of the guaranteed delay flow aggregates, the respective service rate is at least as large as a sum of a set of service rates allocated to a respective set of guaranteed delay flow aggregates associated with the respective network output at a respective set of network nodes preceding the network node in a network path to the respective network output. In at least some example embodiments, each of the guaranteed delay flow aggregates has associated therewith a respective timestamp, wherein the transmission of the packets of the guaranteed delay traffic flows from the network node is controlled based on the respective timestamps associated with the respective guaranteed delay flow aggregates. In at least some example embodiments, for each of the guaranteed delay flow aggregates, the respective timestamp is associated with one of the packets of one of the guaranteed delay traffic flows associated with the respective guaranteed delay flow aggregate and is computed based on at least one of a local time at the network node, a timestamp of a previously arrived packet of the respective guaranteed delay flow aggregate, a size of the packet of the one of the guaranteed delay traffic flows, or a service rate allocated to the guaranteed delay flow aggregate. In at least some example embodiments, the transmission of the packets of the guaranteed delay traffic flows from the network node is controlled based on a set of guaranteed delay queues associated with the respective guaranteed delay flow aggregates. In at least some example embodiments, the transmission of the packets of the guaranteed delay traffic flows from the network node is controlled based on a set of timestamps associated with the respective guaranteed delay queues. In at least some example embodiments, for at least one of the timestamps, the timestamp is a per-packet timestamp associated with one of the packets, wherein the per-packet timestamp is determined for the one of the packets based on arrival of the one of the packets to the respective guaranteed delay queue and is associated with the respective guaranteed delay queue based on the one of the packets becoming a head packet of the respective guaranteed delay queue. In at least some example embodiments, the per-packet timestamp is computed based on a timestamp of a previous tail packet of the respective guaranteed delay queue, a size of the one of the packets, and a service rate of the respective guaranteed delay queue. In at least some example embodiments, for at least one of the timestamps, the timestamp is a per-queue timestamp associated with the respective guaranteed delay queue, wherein the per-queue timestamp is determined for the respective guaranteed delay queue based on one of the packets reaching a respective head position of the respective guaranteed delay queue. In at least some example embodiments, the per-queue timestamp is computed based on a previous per-queue timestamp associated with the respective guaranteed delay queue, a size of the one of the packets, and a service rate of the respective guaranteed delay queue. In at least some example embodiments, the means for controlling transmission of the packets of the guaranteed delay traffic flows from the network node includes means for selecting one of the guaranteed delay queues for which the respective timestamp is a lowest timestamp satisfying an eligibility condition. In at least some example embodiments, the eligibility condition is based on a size of a head packet of the one of the guaranteed delay queues, a service rate allocated to the respective guaranteed delay flow aggregate of the one of the guaranteed delay queues, and the respective timestamp associated with the one of the guaranteed delay queues. In at least some example embodiments, the transmission of the packets of the guaranteed delay traffic flows from the network node is controlled based on a guaranteed delay queue associated with the guaranteed delay flow aggregates. In at least some example embodiments, the transmission of the packets of the guaranteed delay traffic flows from the network node is controlled based on a set of timestamps associated with the respective packets of the guaranteed delay traffic flows. In at least some example embodiments, for at least one of the packets, the respective timestamp for the packet is determined based on at least one of a timestamp of a previously arrived packet of one of the guaranteed delay flow aggregates with which the packet is associated, a size of the packet, or a service rate of the one of the guaranteed delay flow aggregates with which the packet is associated. In at least some example embodiments, the means for controlling transmission of the packets of the guaranteed delay traffic flows from the network node includes means for selecting one of the packets of the guaranteed delay traffic flows for which the respective timestamp is a lowest timestamp satisfying an eligibility condition. In at least some example embodiments, the eligibility condition is based on a size of the one of the packets, a service rate allocated to the respective guaranteed delay flow aggregate of the respective guaranteed delay flow of the one of the packets, and the respective timestamp associated with the packet.

In at least some example embodiments, an apparatus includes at least one processor and at least one memory including a set of instructions, wherein the set of instructions is configured to, when executed by the at least one processor, cause the apparatus to determine, by a network controller of a network, a set of service rates for a respective set of guaranteed delay flow aggregates of a network node, wherein the guaranteed delay flow aggregates are associated with a respective set of network outputs of the network and send, by the network controller toward the network node, the set of service rates for the respective set of guaranteed delay flow aggregates associated with the respective set of network outputs of the network. In at least some example embodiments, a non-transitory computer-readable medium stores a set of instructions configured to cause an apparatus to determine, by a network controller of a network, a set of service rates for a respective set of guaranteed delay flow aggregates of a network node, wherein the guaranteed delay flow aggregates are associated with a respective set of network outputs of the network and send, by the network controller toward the network node, the set of service rates for the respective set of guaranteed delay flow aggregates associated with the respective set of network outputs of the network. In at least some example embodiments, a method includes determining, by a network controller of a network, a set of service rates for a respective set of guaranteed delay flow aggregates of a network node, wherein the guaranteed delay flow aggregates are associated with a respective set of network outputs of the network and sending, by the network controller toward the network node, the set of service rates for the respective set of guaranteed delay flow aggregates associated with the respective set of network outputs of the network. In at least some example embodiments, an apparatus includes means for determining, by a network controller of a network, a set of service rates for a respective set of guaranteed delay flow aggregates of a network node, wherein the guaranteed delay flow aggregates are associated with a respective set of network outputs of the network and means for sending, by the network controller toward the network node, the set of service rates for the respective set of guaranteed delay flow aggregates associated with the respective set of network outputs of the network.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
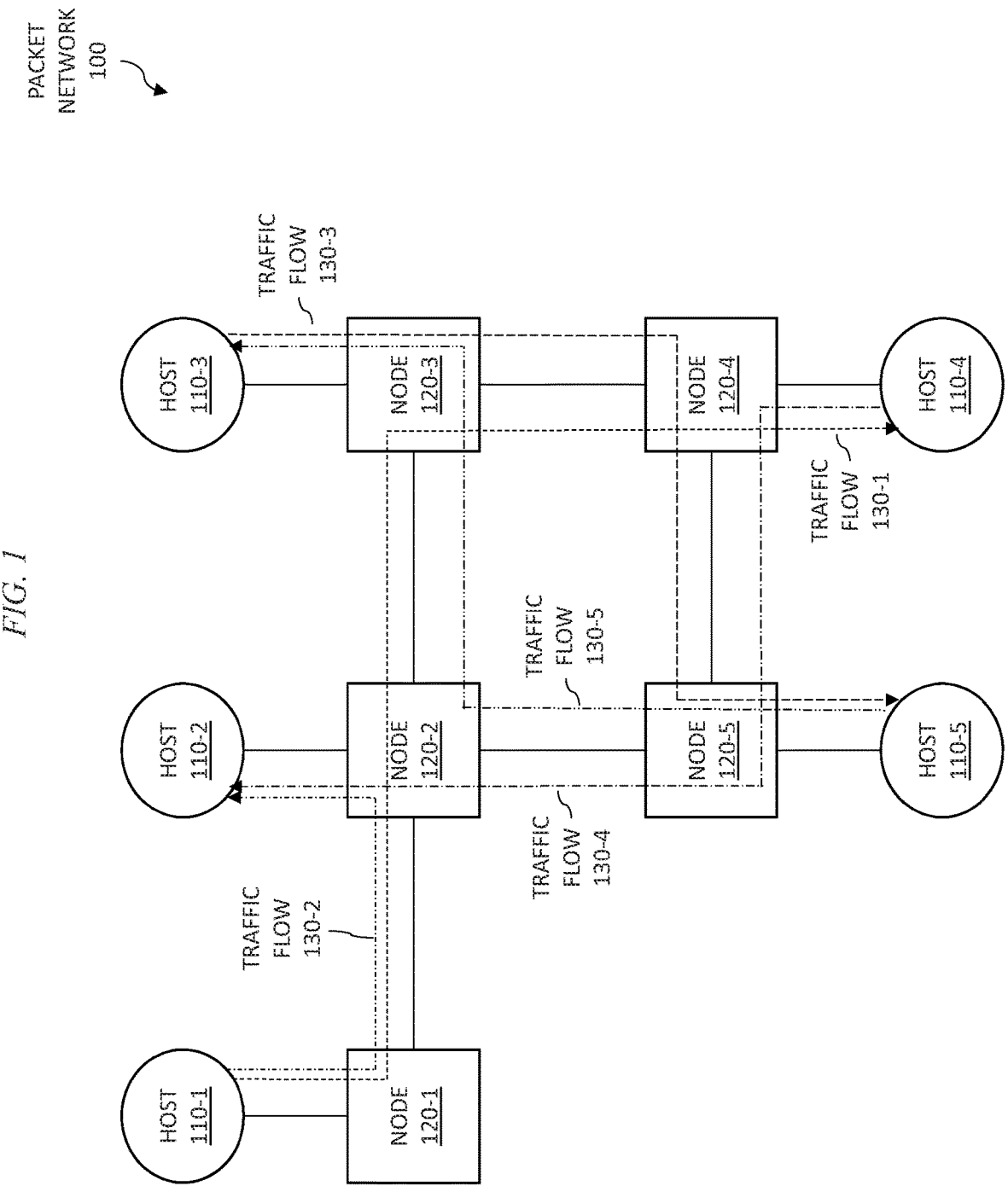
FIG. 1 depicts an example of a packet network including communication devices configured to support communication of guaranteed delay (GD) traffic based on scalable deterministic services.

Various example embodiments for supporting scalable deterministic services in packet networks are presented.

Various example embodiments for supporting scalable deterministic services in packet networks may be configured to support delay guarantees (e.g., finite end-to-end delay bounds) for a class of traffic flows referred to as guaranteed delay (GD) traffic flows. GD traffic flows are supported by a packet network including a set of network nodes (e.g., packet switches, packet routers, or the like), each of which includes a set of one or more network node inputs (e.g., input ports of the like) and a set of one or more network node outputs (e.g., output ports or the like). GD traffic flows are established between network endpoints of the network, i.e., from a network input to a network output. Each GD traffic flow may traverse multiple network nodes between the network input and the network output of the GD traffic flow. There can be multiple GD traffic flows between the same pair of network input and output endpoints. Each GD traffic flow has a delay guarantee and is associated with a traffic profile that is enforced before the packets of the GD traffic flow enter the network. The data rate of the traffic profile for a GD traffic flow also may identify a guaranteed bandwidth or throughput for the GD traffic flow. At each network node within the network, at each network node output of the network node, GD traffic flows destined for the same network output form a GD flow aggregate. The network node forwards packets of GD traffic flows via a network node output based on the association of the GD traffic flows with the GD flow aggregates for the network node output. More specifically, for each network node output of each network node, a respective scheduler associated with a network node output of the network node may not be aware of the identity or rate allocations of the individual GD traffic flows within the GD flow aggregates, but serves packets of GD traffic flows based on the service rates of the GD flow aggregates with which the GD traffic flows are associated. When a packet arrives to a network node, it belongs to an end-to-end GD traffic flow (e.g., the GD traffic flow is the same for the packet in every network node that the packet traverses) and automatically also to the GD flow aggregate that includes that GD traffic flow in that network node. At the next network node in the network path of the packet, the GD traffic flow of the packet is the same, whereas the GD flow aggregate may be different, and larger in volume, because of more GD traffic flows destined for the same network output that arrive at the next network node from other upstream network nodes. The schedulers of the network node outputs are aware of service rate allocations for the GD flow aggregates and assign timestamps to the packets based on those rate allocations (as well as additional information, such as relevant timestamps for the same GD flow aggregates, the sizes of the packets, and so forth). Various example embodiments for supporting scalable deterministic services for GD traffic flows in packet networks based on GD flow aggregates, service rates assigned to GD flow aggregates, various queuing arrangements, various packet scheduling methods, various service rate allocation rules, and so forth, are discussed further herein.

Various example embodiments for supporting scalable deterministic services in packet networks may be configured to support delay guarantees for GD traffic flows of a network based on a queuing arrangement that is based on network outputs of the network, a packet scheduling method that is configured to support scheduling of packets of the GD traffic flows, and a service rate allocation rule configured to support delay guarantees for the GD traffic flows. Various example embodiments for supporting scalable deterministic services in packet networks may be configured to support delay guarantees for GD traffic flows based on a queuing arrangement in which queuing of packets of GD traffic flows at network nodes of a network is based on association of GD flow aggregates of the GD traffic flows with network outputs of the network. Various example embodiments for supporting scalable deterministic services in packet networks may be configured to support delay guarantees for GD traffic flows based on a queuing arrangement in which queuing of packets of GD traffic flows at network nodes of a network is based on use of timestamps computed for the packets of the GD traffic flows. Various example embodiments for supporting scalable deterministic services in packet networks may be configured to support delay guarantees for GD traffic flows based on a queuing arrangement in which queuing of packets of GD traffic flows at a network node output of a network node of a network is based on a set of GD queues at the network node output of the network node which are associated with respective network outputs of the network (e.g., based on per-packet timestamps that are determined for the packets based on arrival of the packets to the respective GD queues and that are associated with the respective GD queues based on the packets becoming head packets of the respective GD queues, based on per-queue timestamps that are determined for the respective GD queues based on new packets reaching respective head positions of the respective GD queues, or the like). Various example embodiments for supporting scalable deterministic services in packet networks may be configured to support delay guarantees for GD traffic flows based on a queuing arrangement in which queuing of packets of GD traffic flows at a network node output of a network node of a network is based on a single GD queue at the network node output of the network node (e.g., timestamps of the packets of the GD traffic flows at the network node output of the network node are computed based on the parameters of the respective GD flow aggregates and sorted in a single GD queue for the network node output of the network node). Various example embodiments for supporting scalable deterministic services in packet networks may be configured to support delay guarantees for GD traffic flows based on a packet scheduling method for scheduling transmission of packets of the GD traffic flows from a network node output of a network node of a network (e.g., based on per-packet timestamps associated with the packets queued at the heads of the GD queues of the network node output of the network node where the network node output of the network node includes GD queues for the respective GD flow aggregates supported by the network node output of the network node, based on per-queue timestamps associated with the GD queues of the network node output of the network node where the network node output of the network node includes GD queues for the respective GD flow aggregates supported by the network node output of the network node, based on per-packet timestamps associated with packets queued in a single GD queue of a network node output of the network node where the network node output of the network node includes a single GD queue for supporting the GD flow aggregates supported by the network node output of the network node, or the like). Various example embodiments for supporting scalable deterministic services in packet networks may be configured to support delay guarantees for GD traffic flows based on a service rate allocation rule configured to support the delay guarantees for GD traffic flows (e.g., each GD flow aggregate at a network node has a service rate associated therewith for use in controlling transmission of packets of the GD traffic flows from the network nodes).

Various example embodiments for supporting scalable deterministic services in packet networks may be configured to determine, by a network controller of a network, a set of service rates for a respective set of GD flow aggregates of a network node, wherein the GD flow aggregates are associated with a respective set of network outputs of the network and send, by the network controller toward the network node, the set of service rates for the respective set of GD flow aggregates associated with the respective set of network outputs of the network. Various example embodiments for supporting scalable deterministic services in packet networks may be configured to receive, by a network node of a network including a set of network outputs, a set of packets of a set of GD traffic flows, wherein each of the GD traffic flows is associated with a respective one of network outputs of the network, queue, by the network node based on a set of GD flow aggregates associated with the respective set of network outputs and based on association of the GD traffic flows with the respective network outputs, the packets of the GD traffic flows, and control, at the network node based on servicing of the set of GD flow aggregates by a scheduler, transmission of the packets of the GD traffic flows from the network node.

It will be appreciated that, although primarily presented within the context of supporting scalable deterministic services in particular types of packet networks (e.g., time-sensitive networks (TSNs) or other types of networks in which delay guarantees may be supported), various example embodiments for supporting scalable deterministic services may be utilized within various other types of packets networks.

It will be appreciated that these and various other example embodiments and associated advantages or potential advantages of supporting scalable deterministic services in packet networks may be further understood by way of reference to the various figures, which are discussed further below.

FIG. 1 depicts an example of a packet network including communication devices configured to support communications based on scalable deterministic services.

The packet network 100 includes communication devices configured to support communication of traffic flows based on scalable deterministic services. More specifically, the packet network 100 includes a set of hosts 110-1-110-5 (collectively, hosts 110) and a set of nodes 120-1-120-5 (collectively, nodes 120) configured to support communications of the hosts 110 in the form of a set of traffic flows 130-1 to 130-5 (collectively, traffic flows 130) between hosts 110 via nodes 120.

The hosts 110 may be any devices which may communicate via the nodes 120. For example, the hosts 110 may be network devices (e.g., routers, switches, access devices, core devices, controllers, or the like), end devices (e.g., user end devices, autonomous end devices, Internet-of-Things (IoT) devices, controllers, actuators, robots, or the like), or the like, as well as various combinations thereof. The hosts 110-1-110-5 are communicatively connected to the nodes 120-1-120-5, respectively. It will be appreciated that fewer or more hosts 110 may be used within the packet network 100.

The nodes 120 may be any devices which may support communications of the hosts 110. For example, the nodes 120 may be routers (e.g., physical routers, virtual routers, or the like), switches, hubs, or the like, as well as various combinations thereof. The nodes 120 are communicatively connected as follows: node 120-1 is communicatively connected to node 120-2, node 120-2 is communicatively connected to node 120-3, node 120-3 is communicatively connected to node 120-4, node 120-4 is communicatively connected to node 120-5, and node 120-5 is communicatively connected to node 120-2. The nodes 120, as discussed further below, are configured to enforce guaranteed delays for communications between the hosts 110 based on support for scalable deterministic services. It will be appreciated that fewer or more nodes 120 may be used within the packet network 100.

The hosts 110 communicate via the nodes 120 in the form of the traffic flows 130. The traffic flows 130 include a traffic flow 130-1 from host 110-1 to host 110-4 (via nodes 120-1, 120-2, 120-3, and 120-4), a traffic flow 130-2 from host 110-1 to host 110-2 (via nodes 120-1 and 120-2), a traffic flow 130-3 from host 110-3 to host 110-5 (via nodes 120-3, 120-4, and 120-5), a traffic flow 130-4 from host 110-4 to host 110-2 (via nodes 120-4, 120-5, and 120-2), and a traffic flow 130-5 from host 110-5 to host 110-3 (via nodes 120-5, 120-2, and 120-3). As such, it will be appreciated that host 110-1 sources two traffic flows (namely, traffic flows 130-1 and 130-2) and does not receive any traffic flows, host 110-2 does not source any traffic flows and receives two traffic flows (namely, traffic flows 130-2 and 130-4), host 110-3 sources one traffic flow (namely, traffic flow 130-3) and receives one traffic flow (namely, traffic flow 130-5), host 110-4 sources one traffic flow (namely, traffic flow 130-4) and receives one traffic flow (namely, traffic flow 130-1), and host 110-5 sources one traffic flow (namely, traffic flow 130-5) and receives one traffic flow (namely, traffic flow 130-3).

The packet network 100 may be configured to support communication of traffic associated with traffic classes. The packet network 100 may be configured to support communication of guaranteed delay (GD) traffic, which is traffic having delay guarantees (e.g., guaranteed finite end-to-end delay bounds). The packet network 100 may be configured to support communication of GD traffic and, optionally, one or more other types of traffic (e.g., high priority traffic (e.g., any traffic having a higher priority than GD traffic (e.g., control traffic or the like)), low priority traffic (e.g., any traffic having a lower priority than GD traffic (e.g., operations, administration, and maintenance (OAM) traffic or the like), best effort (BE) traffic, or the like, as well as various combinations thereof). For example, in packet network 100, the traffic flows 130 may be GD traffic flows for which delay guarantees are to be enforced. It will be appreciated that a flow of GD traffic may be referred to as a GD traffic flow. The packet network 100 may be configured to support communication of GD traffic based on support for scalable deterministic services. It will be appreciated that a packet network configured to support enforcement of end-to-end delays based on use of scalable deterministic services, such as packet network 100, also may be referred to as a scalable deterministic services network.

The packet network 100 may be configured to operate in various ways based on support for use of GD traffic in the packet network 100. For example, the packet network 100 may be configured to operate as a time sensitive network (TSN). For example, the packet network 100 may be configured to operate as a TSN configured to support delay guarantees (e.g., guaranteed finite end-to-end delay bounds) for various flows.

The packet network 100 may be configured to support various applications, at least some of which may be based on support for use of GD traffic and support for communication of GD traffic based on support for scalable deterministic services.

For example, the packet network 100 may be used to support industrial automation applications based on support for communication of industrial control traffic. For example, the packet network 100 may be used to support automation of a factory floor which may have both stationary and mobile wirelessly-connected robots which are under the control of factory controllers (e.g., hosts 110-1 and 110-2 may be factory controllers and hosts 110-3-110-5 may be mobile wirelessly-connected robots). In this example, the packet network 100 may include a set of 5G islands interconnected by a switched Ethernet backbone that enforces minimal latency and jitter for messages traveling both ways between robots and the respective controllers. Here, various example embodiments of scalable deterministic services may be used to provide communication of GD traffic in a manner that supports such applications. For example, various example embodiments of scalable deterministic services may support replacement of 802.1Qbv (or other similar standards) in Industry 4.0 factory networks with wirelessly connected robots (or other similar networks), thereby significantly simplifying the process of allocating and removing flows from the switching backbone of the factory network and, thus, making it possible to keep the network in operation while changes in the flow population take place (with 802.1Qbv, each modification of the flow population typically requires a full reconfiguration of the network and, thus, also a temporary interruption of its operation). It will be appreciated that the packet network 100 may be used to support various other similar or related applications based on support for communication of GD traffic based on support for scalable deterministic services.

For example, the packet network 100 may be used to support distribution of real-time audio-video content at a fixed encoding rate. Here, the real-time nature of the content typically requires that multiple copies of the same stream be delivered to the respective receivers within a very tight interval, and that distinct streams associated with the same content (e.g., the audio and video streams from a given scene) also be delivered to their common receiver within a very tight interval (e.g., hosts 110 may operate as sources and/or receivers of the content). In this example, the packet network 100 may include one or more local area networks (LANs) where packet forwarding is based on layer-2 switching, one or more wide area networks (WANs) of relatively large geographical span where packet forwarding is based on layer-3 routing, and the like, as well as various combinations thereof. Here, various example embodiments of scalable deterministic services may be used to provide communication of GD traffic in a manner that supports such applications. For example, various example embodiments of scalable deterministic services may support extension of 802.1Qav capabilities to routed networks with broader geographical scope, since various example embodiments of scalable deterministic services may enforce much tighter delay bounds as compared to 802.1Qav alone or 802.1Qav combined with 802.1Qcr. It will be appreciated that the packet network 100 may be used to support various other similar or related applications based on support for communication of GD traffic based on support for scalable deterministic services.

For example, the packet network 100 may be used to provide a data center network which may be used for various purposes. For example, some or all of the hosts 110 and nodes 120 of packet network 100 may be instantiated physically inside one or more data centers, may be instantiated virtually inside one or more data centers, or the like, as well as various combinations thereof.

It will be appreciated that the packet network 100 may be configured to support various other applications which may be based on support for use of GD traffic in the packet network 100 and that embodiments of scalable deterministic services may be used for communication of GD traffic in a manner that supports such applications.

The packet network 100 may be configured to support scalable deterministic services for GD traffic and, optionally, for one or more other types of traffic which may be transported within the packet network 100 (e.g., scalable deterministic services may or may not be applied to one or more other traffic types when scalable deterministic services are applied to the GD traffic). It is noted that, based on use of scalable deterministic services for communication of GD traffic of GD traffic flows, it is possible to associate each GD traffic flow in the network with two closed-form end-to-end delay bounds as follows: (1) an Invariant Delay Bound (IDB), which quantifies the worst-case delay that packets of a GD traffic flow may ever experience within the packet network 100, based on its regulator parameters and its network path and (2) an Effective Delay Bound (EDB), which depends on the service rates allocated to the GD flow aggregates and which also depends on the set of other GD traffic flows currently established over the packet network 100. The EDB is a tight bound, but it is also sensitive to the distribution of flows throughout the packet network 100, so it can change for a given flow as new flows are added to the packet network 100 and old flows are removed from the packet network 100. The IDB is independent of the flow population and, therefore, may prove loose under most distributions of established flows.

The packet network 100 may be configured to support scalable deterministic services for GD traffic of the packet network based on (1) a queuing arrangement, (2) a packet scheduling method, and (3) a service rate allocation rule devised to guarantee delay bounds for GD traffic of GD flows.

The scalable deterministic services queuing arrangement may be based on use of a single GD traffic class for GD traffic flows having delay guarantees (e.g., as opposed to IEEE 802.1Qav, which uses two distinct traffic classes (Class A and Class B)). The scalable deterministic services queuing arrangement may be configured such that, in front of each network link, GD traffic flows of the GD class are grouped into a set of GD flow aggregates associated with distinct network outputs. The "network" in "network output" is the set of network nodes over which the delay guarantees are enforced (e.g., nodes 120 in FIG. 1). The "output" in "network output" may be the output port of an edge node that communicates with an end host (e.g., hosts 110 in FIG. 1), the output port of an edge node that communicates with an edge node of another network, or the like. The scalable deterministic services queuing arrangement may be configured such that, at the network node output (e.g., node output port or the like) in front of each network link, packets of GD traffic flows of the GD class are grouped into a set of queues where the set of queues may include (1) a set of GD queues including one GD queue per GD flow aggregate associated with a network output that is reachable through the network link or (2) a single queue associated with GD flow aggregates associated with network outputs reachable through the network link. It is noted that various control methods may be used to ensure that the nodes of the network (e.g., the nodes 120 of packet network 100) know all of the network outputs and know how to map information from the packets (e.g., the destination IP address in examples discussed hereinabove, although it will be appreciated that other information from the packets may be used for network output identification) onto the known network outputs. It is noted that association of the GD flow aggregates with the network outputs may be realized by the nodes of the network based on configuration of each node of the network to expose a configuration interface to enable the automatic discovery of the network outputs or explicit provisioning of the network outputs (e.g., via a Software Defined Networking (SDN) controller or other suitable controller). It is noted that the destination IP address in the packet header is assumed to be sufficient to identify the network outputs (although it will be appreciated that other fields or combinations of fields of the packet headers may be used to identify the network outputs). It is further noted that different values of the destination IP address may map onto the same network output when the hosts of the addresses do not reside in the network that enforces the delay guarantees. It will be appreciated that the scalable deterministic services queuing arrangement for packet network 100 of FIG. 1 may be further understood by way of reference to FIG. 2.

Figure 2:
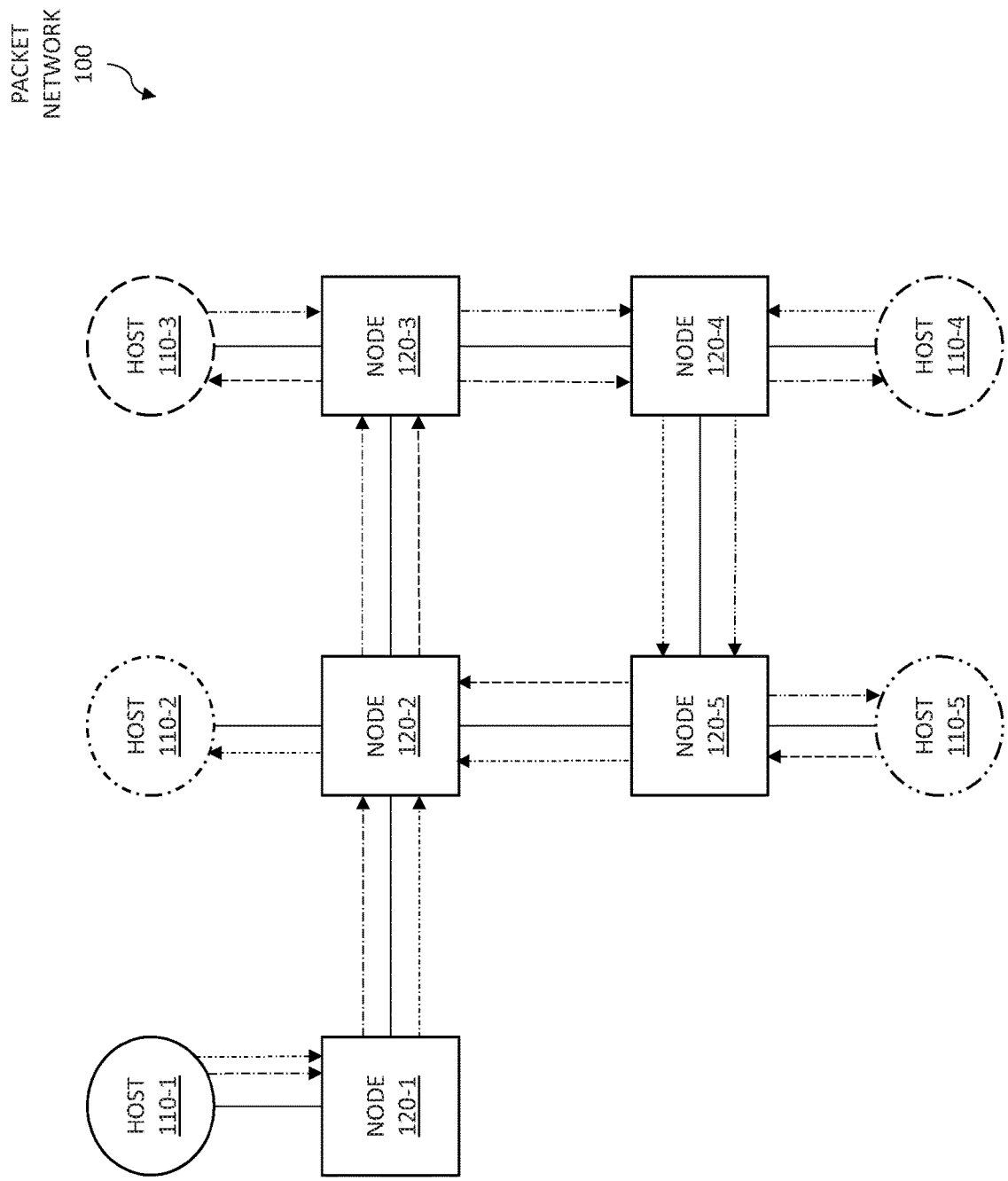
FIG. 2 depicts an example of a scalable deterministic services queuing arrangement for the packet network of FIG. 1.

The scalable deterministic services queuing arrangement, as indicated above, may be configured such that, at the network node output e.g., node output port or the like) in front of each network link, GD traffic flows of the GD class are grouped into GD flow aggregates. FIG. 2 depicts an example of a scalable deterministic services queuing arrangement for the packet network 100 of FIG. 1. In FIG. 2, for each pair of nodes 120, the arrow between the nodes 120 in the pair of nodes 120 identifies a GD flow aggregate in the source node 120 of the pair of nodes 120. For example, node 120-1 would include two GD flow aggregates for the traffic flows for which the network outputs are host 110-2 and host 110-4, respectively. For example, node 120-2 would include two GD flow aggregates for the traffic flows for which the network outputs are host 110-3 and host 110-4, respectively. For example, node 120-3 would include two GD flow aggregates for the traffic flows for which the network outputs are host 110-4 and host 110-5, respectively. For example, node 120-4 would include two GD flow aggregates for the traffic flows for which the network outputs are host 110-2 and host 110-5, respectively. For example, node 120-5 would include two GD flow aggregates for the traffic flows for which the network outputs are host 110-2 and host 110-3, respectively. The GD flow aggregates at the network nodes may be serviced at the network nodes based on (1) use of a multiple queue (MQ) arrangement in which, at a network node output of a network node, each GD flow aggregate at the network node output of the network node has a dedicated GD queue associated therewith and the GD queues (and, thus, the GD flow aggregates) at the network node output of the network node may be serviced based on service rates assigned to the GD queues (and, thus, the GD flow aggregates) at the network node output of the network node (an example embodiment of which is presented in FIG. 3) or (2) use of a single queue (SQ) arrangement in which, at a network node output of a network node, the GD flow aggregates at the network node output of the network node use a single shared queue and the GD flow aggregates at the network node output of the network node are serviced based on service rates assigned to the GD flow aggregates at the network node output of the network node (an example embodiment of which is presented in FIG. 4).

The scalable deterministic services scheduler is configured to distribute service to the GD flow aggregates of the GD traffic class. The scalable deterministic services scheduler may be a non-work-conserving scheduler. The scalable deterministic services scheduler may be a non-work-conserving instance of a rate-proportional server (RPS). The scalable deterministic services scheduler may be a Shaped Virtual Clock (Sh-VC) scheduler. It is noted that various control methods may be used to ensure that the scalable deterministic services scheduler knows all of the network outputs (e.g., association of the GD flow aggregates with the network outputs may be realized by the scalable deterministic services scheduler of the network based on configuration of each node of the network to expose a configuration interface to enable the automatic discovery of the network outputs or explicit provisioning of the network outputs (e.g., via an SDN controller or other suitable controller)).

The scalable deterministic services scheduler is configured to distribute service to the GD flow aggregates of the GD traffic class based on service rates allocated to the GD flow aggregates of the GD traffic class. The rule for allocation of service rates to the GD flow aggregates of the GD traffic class may be that the service rate $R_l^k$ that is allocated to the GD flow aggregate of network output l at network node k is at least as large as the sum of the service rates allocated to the GD flow aggregates of the same network output at all nodes $j \in U_l^{k-1}$ that precede node k in the network path to output l, which may be represented as follows:

$$R_l^k \geq \sum_{j \in U_l^{k-1}} R_l^j.$$

It is noted that the service rates also may be referred to herein as scheduling rates.

In the packet network 100, for a given GD traffic flow, the most upstream node is the end host or node that feeds the flow to the edge node of packet network 100. The GD traffic flow is assumed to be regulated at the source of the GD flow (i.e., the node of contact with the guaranteed-delay network). The GD traffic flow may be regulated at the source of the GD traffic flow by a Length-Rate Quotient (LRQ) regulator (e.g., a leaky bucket with a bucket size equal to the largest size of a packet of the GD flow). If multiple GD traffic flows destined for the same network output enter the network through the same network input, each GD traffic flow of the multiple GD traffic flows is assumed to comply with the respective regulator of the respective GD traffic flow (i.e., the traffic profile of a GD traffic flow is enforced before the GD traffic flow enters the network, or, in other words, every GD traffic flow complies with its traffic profile when it enters the network), and the GD flow aggregate of the multiple GD traffic flows is also assumed to comply with a respective regulator, which also may be an LRQ regulator. It is also assumed that each GD traffic flow is routed to its network output based on a network-wide (e.g., as opposed to flow-specific) routing policy such that, after two GD traffic flows with a common network output merge into a common GD flow aggregate at a network node, the two GD traffic flows keep the same common path until reaching that common network output. As illustrated in FIGS. 1 and 2, GD traffic flows with a common network output form a tree topology rooted at the network output (illustratively, traffic flows 130-2 and 130-4 of FIG. 1, both of which terminate at host 120-2, are illustrated as being part of a common tree topology associated with host 120-2).

The packet network 100, in addition to supporting communication of GD traffic, also may be configured to support communication of traffic having higher priority than the GD traffic. The communication of traffic having a higher priority than the GD traffic may be supported using a higher priority traffic queue which may be serviced by the scalable deterministic services scheduler that services the GD flow aggregates of the GD traffic. For example, the packet network 100 may be configured to support communication of control traffic having higher priority than the GD traffic. For example, the control traffic may be traffic of the CDT class of the IEEE 802.1Qav standard. In the IEEE 802.1Qav standard, CDT traffic is assumed to be shaped by a leaky-bucket regulator at every network link. The rate of the regulator is assigned a-priori, independently of the level of bandwidth allocation reached at the link by Class-A and Class-B traffic.

In one example, communication of such CDT traffic (or other types of higher priority traffic) in addition to GD traffic may be supported using a CDT queue for queuing of the CDT traffic where the CDT traffic may be assigned a CDT rate (e.g., a shaping rate) at the scalable deterministic services scheduler (e.g., a Sh-VC scheduler or other suitable scheduler) that handles the GD traffic. The CDT rate can be set a-priori or adjusted to the variations of total service rate allocated to GD traffic at every network link, so that the total service rate allocated to GD traffic and CDT traffic is equal, or arbitrarily close, to the link capacity. As long as the sum of the allocated service rates for the GD and CDT classes does not exceed the link capacity, both the IDB and the EDB remain insensitive to the service rate allocated to the CDT class.

In one example, communication of such CDT traffic (or other types of higher priority traffic) in addition to GD traffic may be supported using a CDT queue for queuing of the CDT traffic without associating the CDT queue with an explicit service rate. In one example, the CDT queue may be assigned a higher priority than the scalable deterministic services scheduler (e.g., a Sh-VC scheduler or other suitable scheduler) that handles the GD traffic. In one example, the CDT queue may be assigned a lower priority than the scalable deterministic services scheduler (e.g., a Sh-VC scheduler or other suitable scheduler) that handles the GD traffic but a higher priority than other queues for other types of traffic which also may be supported (e.g., BE queues for BE traffic).

It will be appreciated that, irrespective of whether or not an explicit service rate is associated with the higher priority queue for the higher priority traffic (e.g., the CDT queue for CDT traffic as in the examples discussed above), healthy operation of the overall framework may be maintained based on regulation of the higher priority traffic entering the network (e.g., similar to healthy operation of a network that supports GD traffic and CDT traffic according to the IEEE 802.1Qav standard).

The packet network 100, in addition to supporting communication of GD traffic, also may be configured to support communication of traffic having lower priority than the GD traffic. The communication of traffic having a lower priority than the GD traffic may be supported using a lower priority traffic queue which, rather than being serviced by the scalable deterministic services scheduler that services the GD flow aggregates of the GD traffic, may be serviced by a scheduler that services the scalable deterministic services scheduler that services the GD flow aggregates of the GD traffic. For example, the packet network 100 may be configured to support communication of BE traffic having lower priority than the GD traffic. In one example, the BE traffic may be handled as in the IEEE 802.1Qav standard. For example, in the IEEE 802.1Qav standard, BE traffic may be handled using one or more BE class queues per network link at each node. In one example, the BE traffic may be handled using a more fine-grained queuing arrangement (e.g., one queue per network output in front of every network link). It will be appreciated that, in each of the examples discussed above for handling of BE traffic, the BE traffic may be served only when no higher-priority traffic queue is eligible for service.

Figure 3:
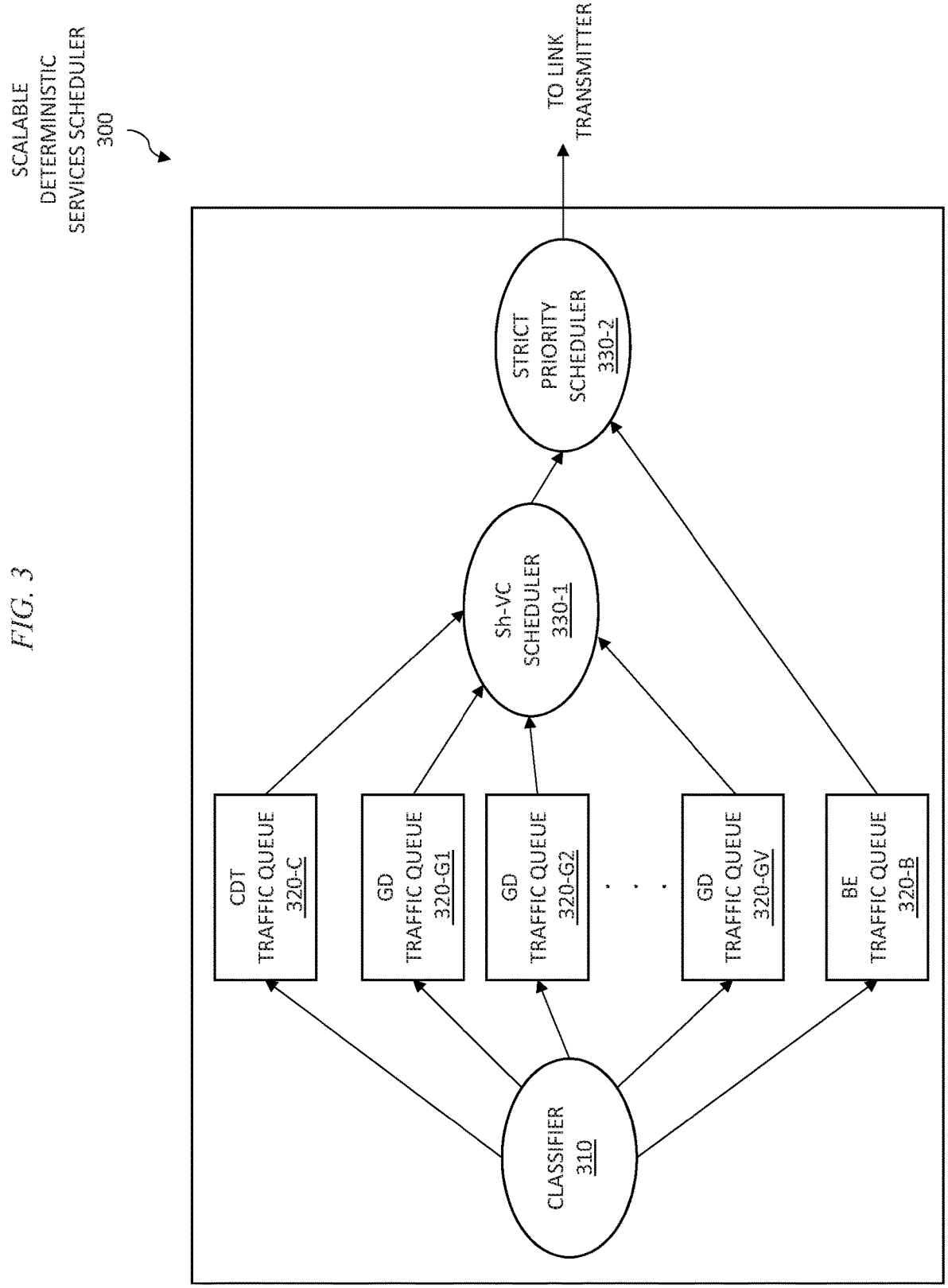
FIG. 3 depicts an example of a scalable deterministic services scheduler configured to support communication of GD traffic, based on scalable deterministic services, using a set of queues associated with a respective set of GD flow aggregates supported at the scalable deterministic services scheduler.

FIG. 3 depicts an example of a scalable deterministic services scheduler configured to support communication of GD traffic, based on scalable deterministic services, using a set of queues associated with a respective set of GD flow aggregates supported at the scalable deterministic services scheduler.

The scalable deterministic services scheduler 300 is associated with a network node output (e.g., a network link associated with an output port) of a network node. It is noted that this may be seen from FIG. 3 in the reference to the link transmitter associated with the output of the scalable deterministic services scheduler 300, since the traffic handled by the scalable deterministic services scheduler 300 may be provided to the link transmitter of the network link for transmission via the network link. Accordingly, it will be appreciated that, where a network node includes multiple network links, the network node may include multiple scalable deterministic services schedulers 300 for controlling the transmission of traffic over the multiple network links, respectively.

The scalable deterministic services scheduler 300 includes a classifier 310, a set of traffic queues 320, and a set of schedulers 330. The set of traffic queues 320 includes a CDT traffic queue 320-C, a set of GD traffic queues 320-G1-320-GV (collectively, GD traffic queues 320-G), and a BE traffic queue 320-B. The set of schedulers 330 includes an Sh-VC scheduler 330-1 and a strict-priority scheduler 330-2. It is noted that various buffer management methods (e.g., physical, logical, or combinations thereof) may be used to control accumulation of packets in the queues 320.

The classifier 310 and the traffic queues 320 are configured to support queuing of packets received at the scalable deterministic services scheduler 300. The classifier 310 maps packets onto the traffic classes as the packets arrive to the scalable deterministic services scheduler 300. The traffic classes, as indicated above, include the CDT, GD, and BE traffic classes (although it will be appreciated that fewer or more traffic classes may be supported). The classifier 310 may determine the mapping of the packets onto the traffic classes based on various packet classification techniques (e.g., based on packet header analysis, deep packet inspection, or the like, as well as various combinations thereof). The CDT packets are queued based on the CDT traffic queue 320-C, the GD packets are queued based on the GD traffic queues 320-G, and the BE packets are queued based on the BE traffic queue 320-B. The GD packets of GD traffic flows are further separated based on the respective network outputs for which the GD traffic flows are intended, with the GD traffic queues 320-G1 to 320-GV corresponding to the V potential network outputs for which GD traffic flows may be intended and the GD packets of the GD traffic flows being mapped onto the GD traffic queues 320-G based on the network outputs for which the GD traffic flows are intended, respectively. The GD traffic queues 320 may be implemented as first-in-first-out (FIFO) queues or using other suitable types of queuing techniques. The mapping of the GD packets of the GD traffic flows to the GD traffic queues 320-G, such that the GD traffic flows to which the GD packets belong are mapped to the GD traffic queues 320-G, may be based on identification of the network outputs for which the GD packets of the GD traffic flows are intended (e.g., based on lookup of the destination IP addresses of the GD packets or based on other information of the GD packets which may be analyzed to determine the network outputs for which the GD packets of the GD traffic flows are intended).

The Sh-VC scheduler 330-1 is configured to service the CDT traffic queue 320-C and the GD traffic queues 320-G. The Sh-VC scheduler 330-1 may service the CDT traffic queue 320-C and the GD traffic queues 320-G based on use of timestamps.

The Sh-VC scheduler 330-1 may associate timestamps with GD packets. The Sh-VC scheduler 330-1 may associate a timestamp with a GD packet $p_i^{k+1}$ of GD flow aggregate $A_i$ as follows: $F_i^{k+1} = \max(F_i^k, t) + l_i^{k+1}/R_i$, where t is the current local time at the node of the Sh-VC scheduler 330-1, $F_i^k$ is the timestamp of the previously arrived packet $p_i^k$ of GD flow aggregate $A_i$, $l_i^{k+1}$ is the size of the packet $p_i^{k+1}$, and $R_i$ is the service rate allocated to flow aggregate $A_i$.

The Sh-VC scheduler 330-1 may service the CDT traffic queue 320-C and the GD traffic queues 320-G based on use of timestamps assigned to packets and service rates associated with the CDT traffic queue 320-C (and, thus, with all the CDT traffic of the CDT traffic queue) and with the GD traffic queues 320-G (and, thus, with the GD flow aggregates of the GD traffic queues 320-G). At any time $t_s$ when the network link is available for transmission of a new packet and at least one queue served by the Sh-VC scheduler 330-1 has at least one packet queued, the Sh-VC scheduler 330-1 looks for the queue whose head packet has the lowest timestamp $F_s$ that is eligible for service:

$$F_s = \min_{j \in \{1, 2, ..., V\}} \left\{ F_j^h : q_j > 0 \text{ AND } F_j^h - \frac{l_j^h}{R_j} \leq t_s \right\},$$

where $q_j$ is the current length of queue j, $F_j^h$ is the timestamp of the head packet of queue j, and $l_j^h$ is the length of the head packet of queue j. The eligibility condition for queue selection ($F_j^h - l_j^h/R_j \leq t_s$) ensures that the Sh-VC scheduler 330-1 considers for transmission only the packets for which transmission has already started in the fluid rate-proportional server that is emulated by the Sh-VC scheduler 330-1. The eligibility condition makes the Sh-VC scheduler 330-1 non-work-conserving, which means that, at times, the Sh-VC scheduler 330-1 may not select any traffic queue served by the Sh-VC scheduler 330-1 (namely, the CDT traffic queue 320-C or any GD traffic queue 320-G) for service even when there are traffic queues served by Sh-VC scheduler 330-1 (again, the CDT traffic queue 320-C or any GD traffic queue 320-G) that have packets waiting for transmission. It is noted that use of the real-time clock for the eligibility condition ensures that every queue served by the Sh-VC scheduler 330-1 (again, the CDT traffic queue 320-C or any GD traffic queue 320-G) is served at exactly the rate configured in Sh-VC scheduler 330-1, without ever exceeding that rate.

The Sh-VC scheduler 330-1 may service the CDT traffic queue 320-C and the GD traffic queues 320-G based on use of timestamps in various ways. For example, as discussed further below, the timestamps may include per-packet timestamps (e.g., a timestamp is maintained for each packet in each of the queues 320 served by the Sh-VC scheduler 330-1), per-queue timestamps (e.g., a single timestamp is maintained for each of the queues 320 served by the Sh-VC scheduler 330-1), and so forth. In each case, for each of the queues 320 served by the Sh-VC scheduler 330-1, the timestamp of the head packet of the respective queue 320 is used as the timestamp of the respective queue 320 for determining servicing of the queues 320 served by the Sh-VC scheduler 330-1.

In one example, the Sh-VC scheduler 330-1 maintains per-packet timestamps for use in servicing the CDT traffic queue 320-C and the GD traffic queues 320-G. In one example, the Sh-VC scheduler 330-1 maintains one timestamp for each packet that is queued in each of the queues served by the Sh-VC scheduler 330-1 (namely, the CDT traffic queue 320-C and any GD traffic queues 320-G). In one example, when a packet arrives at one of the queues served by the Sh-VC scheduler 330-1, a timestamp is computed for the arriving packet. The timestamp for the arriving packet (arriving to the node hosting the Sh-VC scheduler 330-1) may be computed based on the timestamp of the previous tail packet of the one of the queues served by the Sh-VC scheduler 330-1 (i.e., the last packet to arrive at the one of the queues served by the Sh-VC scheduler 330-1), the size of the arriving packet, and the allocated service rate of the one of the queues served by the Sh-VC scheduler 330-1, which may be represented as $F_i^{k+1}=\max(F_i^k, t)+l_i^{k+1}/R_i$), where $F_i^k$ is the timestamp of the previous tail packet of the one of the queues served by the Sh-VC scheduler 330-1.

In one example, the Sh-VC scheduler 330-1 maintains per-queue timestamps for use in servicing the CDT traffic queue 320-C and the GD traffic queues 320-G. In one example, the Sh-VC scheduler 330-1 maintains one timestamp for each of the queues served by the Sh-VC scheduler 330-1 and updates the timestamps of the queues as new packets arrive at the heads of the queues (e.g., when the head packet leaves one of the queues served by the Sh-VC scheduler 330-1, the next packet in the one of the queues served by the Sh-VC scheduler 330-1 arrives at the head of the one of the queues served by the Sh-VC scheduler 330-1 and the timestamp that is maintained for the one of the queues served by the Sh-VC scheduler 330-1 is updated). The timestamp for the arriving packet (arriving to the head of the one of the queues served by the Sh-VC scheduler 330-1) may be computed based on the previous timestamp of the one of the queues served by the Sh-VC scheduler 330-1, the size of the arriving packet (again, the new head packet), and the allocated service rate of the one of the queues served by the Sh-VC scheduler 330-1, which may be represented as $F_i^{k+1}=\max(F_i^k, t)+l_i^{k+1}/R_i$), where $F_i^k$ is the previous timestamp of the one of the queues served by the Sh-VC scheduler.

In each case, as indicated above, for each of the queues 320 served by the Sh-VC scheduler 330-1, the timestamp of the head packet of the respective queue 320 is used as the timestamp of the respective queue 320 for determining servicing of the queues 320 served by the Sh-VC scheduler 330-1. Additionally, in each case, the allocated service rate of each of the queues 320 served by the Sh-VC scheduler 330-1 is the same as the allocated service rate of the GD flow aggregate associated with the given network output.

In one example, based on various example embodiments of scalable deterministic services, the frequency of signaling in response to flow allocations and removals may be reduced by increasing and decreasing the allocated service rates by quanta that are larger than the guaranteed rates of the individual flows. In one example, a centralized controller tracks, for each of the GD traffic queues 320-G in the packet network 100, the sum of the requested rates of all of the flows that use the respective GD traffic queue 320-G and the service rate currently allocated at the scalable deterministic services scheduler 300 to the respective GD traffic queue 320-G. It will be appreciated that the latter should not be smaller than the former. In one example, when a new flow is about to be added to the network, the centralized controller adds the requested rate of the new flow to the requested rate accumulators for all of the links that the new flow will traverse and, if any of the requested rate accumulators exceeds the current service rate of the respective GD traffic queue 320-G, the centralized controller increases the service rate by the configured quantum amount. In one example, when an existing flow is removed from the network, the centralized controller updates all of the requested rate accumulators for the links along its path and, if any requested rate accumulator drops below the difference between the current service rate and the allocation quantum, the centralized controller reduces the service rate by the configured quantum amount. In both cases, signaling to the nodes along the data path of the removed flow is needed only when the service rate changes, thereby reducing the frequency of signaling in response to flow allocations and removals.

It will be appreciated that, for various example embodiments of scalable deterministic services, it may be assumed that the routing function precedes the admission of GD traffic flows to the network. In other words, GD traffic flows are added to the network only after all paths from input to output nodes have been identified, with only one path for each input-output pair of nodes. When the allocation of a new GD traffic flow is requested, the new GD traffic flow may be rejected if its allocation requires updating the service rate of at least one of the GD queues it traverses and the scalable deterministic services scheduler 300 in front of the link that serves the GD queue does not have a quantum amount left in its spare bandwidth pool. In one example, accommodation of the new GD traffic flow may be supported (and, thus, the rejection of the new GD traffic flow can be avoided) by allowing the GD queue to increase its service rate only by the amount that is sufficient to accommodate the new flow, if such amount is still available at the link. In one example, accommodation of the new GD traffic flow may be supported (and, thus, the rejection of the new GD traffic flow can be avoided) by routing of the new GD traffic flow over a network path that is different than the single path identified by the underlying routing function for the input-output node pair of the new GD traffic flow.

It will be appreciated that, for various example embodiments of scalable deterministic services, it may be assumed that every network node in the domain of enforcement of delay guarantees serves each GD queue at a rate that does not exceed its allocated service rate. In one embodiment, if a network node in the data path of a GD traffic flow does not satisfy this assumption, the node immediately downstream compensates the violation by policing the traffic aggregate from the upstream node according to the same LRQ profile expected for the aggregate at the upstream node, and then by dropping all packets that exceed the profile. While the delay guarantees of the GD traffic flows in the GD flow aggregate of the GD queue with exceeded service rate may no longer be enforced, the policing of the GD flow aggregate from the upstream node ensures that the delay guarantees of GD traffic flows that merge with the GD flow aggregate at the node immediately downstream remain intact. Additionally, it is noted that, where traffic from upstream nodes is not policed, the enforcement of the expected LRQ profile by the scalable deterministic services scheduler 300 at the node immediately downstream ensures that only the GD traffic flows with common network output that merge at the downstream node can have their delay guarantees violated while the guarantees of GD traffic flows destined for the same output that merge at nodes further downstream remain intact.

It will be appreciated that the scalable deterministic services scheduler 300 may be configured in various other ways (e.g., for supporting GD, CDT, and BE traffic), may be configured to support various other types of traffic (e.g., in addition to or in place of CDT traffic, in addition to or in place of BE traffic, and the like), and the like, as well as various combinations thereof. For example, it will be appreciated that fewer or more GD queues 320-G may be used, that fewer or more CDT queues 320-C may be used, that fewer or more BE queues 320-B may be used, and the like. For example, it will be appreciated that other types of schedulers may be supported (e.g., a scheduler other than an Sh-VC scheduler (illustratively, Sh-VC scheduler 330-1) may be used for scheduling of GD and CDT traffic, a scheduler other than a strict priority scheduler (illustratively, strict priority scheduler 330-2) may be used for servicing the Sh-VC scheduler 330-1 and the BE queue 320-B, and the like), fewer or more schedulers 330 may be supported, other arrangements of schedulers 330 may be supported, or the like, as well as various combinations thereof. For example, it will be appreciated that higher priority traffic in addition to or other than CDT traffic may be supported, that lower priority traffic in addition to or other than BE traffic may be supported, and the like, as well as various combinations thereof.

Figure 4:
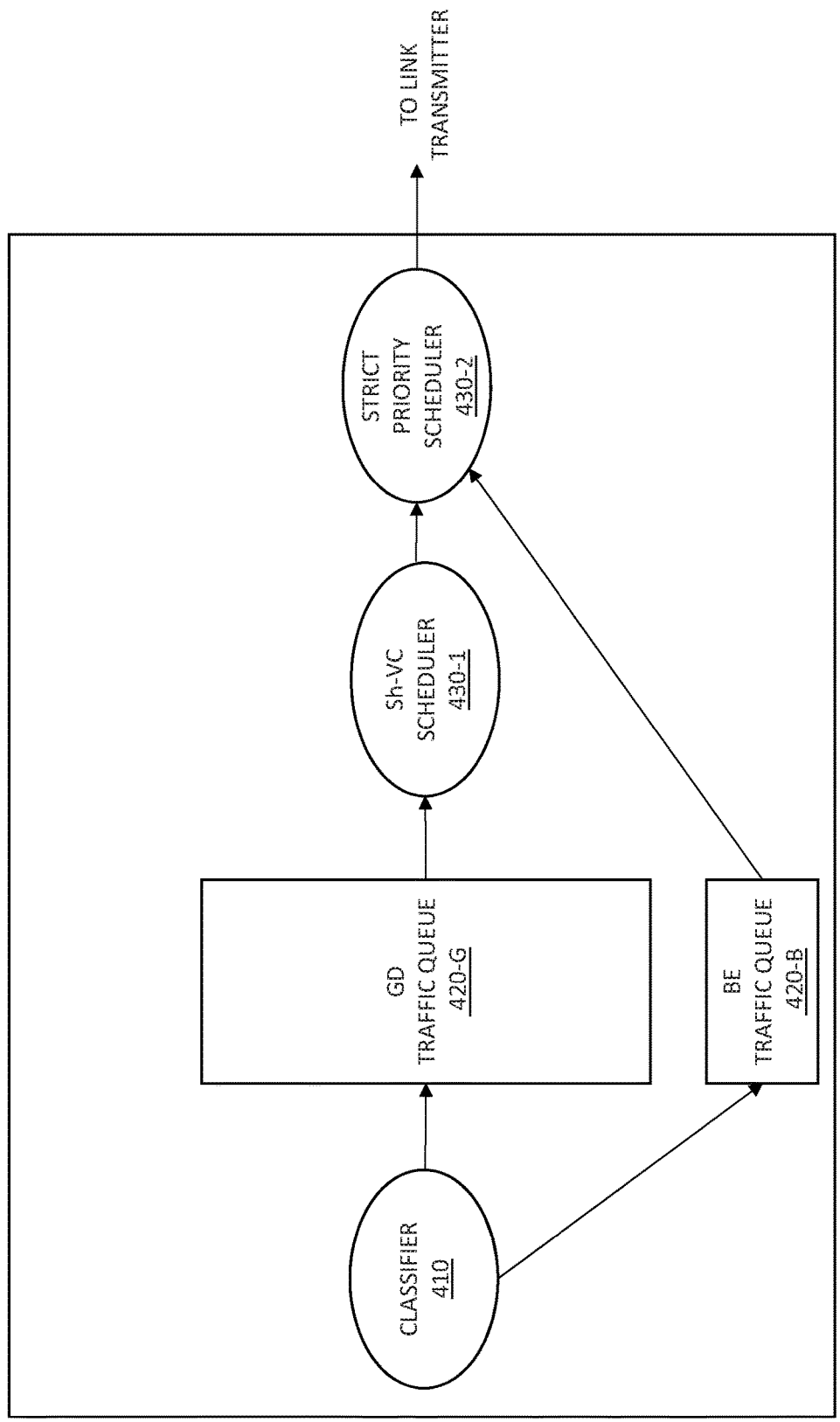
FIG. 4 depicts an example of a scalable deterministic services scheduler configured to support communication of GD traffic, based on scalable deterministic services, using a single queue for a set of GD flow aggregates supported at the scalable deterministic services scheduler.

FIG. 4 depicts an example of a scalable deterministic services scheduler configured to support communication of GD traffic, based on scalable deterministic services, using a single queue for a set of GD flow aggregates supported at the scalable deterministic services scheduler.

The scalable deterministic services scheduler 400 is associated with a network node output (e.g., a network link associated with an output port) of a network node. It is noted that this may be seen from FIG. 4 in the reference to the link transmitter associated with the output of the scalable deterministic services scheduler 400, since the traffic handled by the scalable deterministic services scheduler 400 may be provided to the link transmitter of the network link for transmission via the network link. Accordingly, it will be appreciated that, where a network node includes multiple network links, the network node may include multiple scalable deterministic services schedulers 400 for controlling the transmission of traffic over the multiple network links, respectively.

The scalable deterministic services scheduler 400 of FIG. 4 is similar to the scalable determining services scheduler 300 of FIG. 3, with the exception that the CDT traffic queue 320-C and the set of GD traffic queues 320-G (where a GD queue 320-G is maintained for each of the GD flow aggregates handled by the scalable deterministic services scheduler 300, respectively) are replaced with a GD traffic queue 420-G (i.e., a single GD queue is maintained for all of the CDT traffic and all of the GD flow aggregates handled by the scalable determining services scheduler 400). Accordingly, the scalable deterministic services scheduler 400 includes a classifier 410, a set of traffic queues 420, and a set of schedulers 430, where the set of traffic queues 420 includes the GD traffic queue 420-G and a BE traffic queue 420-B, and the set of schedulers 430 includes an Sh-VC scheduler 430-1 and a strict-priority scheduler 430-2. It is noted that the operation of classifier 410, BE traffic queue 420-B, Sh-VC scheduler 430-1, and strict-priority scheduler 430-2 of the scalable deterministic services scheduler 400 of FIG. 4 may be similar to that of classifier 310, BE traffic queue 320-B, Sh-VC scheduler 330-1, and strict-priority scheduler 330-2 of the scalable deterministic services scheduler 300 of FIG. 3 and, thus, that a description of the operation of these elements is omitted from the description of the scalable deterministic services scheduler 400 of FIG. 4. It is noted that, in the scalable deterministic services scheduler 400 of FIG. 4, GD traffic is handled using one or more GD flow aggregates having one or more service rates, respectively, associated therewith. It is further noted that, in the scalable deterministic services scheduler 400 of FIG. 4, CDT traffic is handled as a single CDT traffic aggregate having a respective CDT service rate associated therewith and, thus, that the CDT packets are handled the same way as the GD packets of the GD traffic aggregates. It is also noted that various buffer management methods (e.g., physical, logical, or combinations thereof) may be used to control accumulation of packets in the queues 420.

In one example, the GD traffic queue 420-G is configured such that the CDT packets of the CDT traffic flows and the GD packets of the GD traffic flows are mapped into the GD traffic queue 420-G (i.e., the GD traffic queue 420-G is a single queue configured to handle the CDT packets of the CDT traffic and the GD packets of each of the GD traffic flows of each of the GD flow aggregates supported by the scalable deterministic services scheduler 400). The GD traffic queue 420 may be implemented as a Push-In First-Out (PIFO) queue (i.e., the initial placement of a packet is not necessarily the tail of the queue as in the FIFO case, but the packets are extracted from the head of the queue), a Push-In Extract-Out (PIEO) queue (i.e., the initial placement of a packet is not necessarily the tail of the queue as in the FIFO case and similarly, the packets are not necessarily extracted from the head of the queue but may be extracted from any location of the queue based on one or more conditions), or using other suitable types of queuing techniques. It is noted that a PIFO queue may be implemented as a calendar queue (e.g., using an array of slots associated with timestamp ranges such that an arriving packet is queued to the slot corresponding to the range of its timestamp and packets queued in the same slot are served in FIFO order). It is further noted that a PIEO queue may be considered to be a more complex calendar queue (e.g., using multiple arrays of slots where packets are associated with sub-arrays based on their size/rate ratio) that is configured to account for eligibility conditions (e.g., the eligibility condition of a non-work conserving scheduler) for extraction of packets.

In one example, the Sh-VC scheduler 430-1 maintains per-packet timestamps for use in servicing the CDT traffic aggregate and the GD flow aggregates of the GD traffic queue 420-G. In one example, the Sh-VC scheduler 430-1 maintains a timestamp for each packet (e.g., a CDT packet of CDT traffic or a GD packet of a GD traffic flow of a GD flow aggregate) that is queued in the GD traffic queue 420-G served by the Sh-VC scheduler 430-1. In one example, when a packet (e.g., a CDT packet or a packet of a GD traffic flow) arrives at the GD traffic queue 420-G, a timestamp is computed for the arriving packet (e.g., arriving to the node hosting the Sh-VC scheduler 430-1). The timestamp for the arriving packet may be computed based on the timestamp of the previously arrived packet (e.g., previously arrived CDT packet or packet of the GD traffic flow), the size of the arriving packet, and the associated service rate (e.g., the service rate of the CDT traffic where the arrived packet is a CDT packet or the service rate of the GD flow aggregate where the arrived packet is a GD packet of a GD traffic flow of a GD flow aggregate). The Sh-VC scheduler 430-1 places the arrived packet within the GD traffic queue 420-G based on the ranking of its timestamp compared to the other timestamps that are currently in the GD traffic queue 420-G.

In one example, the Sh-VC scheduler 430-1 may service the CDT traffic and the GD flow aggregates supported by the GD traffic queue 420-G based on use of timestamps assigned to packets and the service rates associated with the CDT traffic aggregate and the GD flow aggregates supported by the GD traffic queue 420-G. In one example, where the GD traffic queue 420-G is a PIFO queue implemented as a calendar queue, after completing a packet transmission, Sh-VC scheduler 430-1 searches for the non-empty slot with the minimum timestamp and serves the head packet in that slot in FIFO order. In one example, where the GD traffic queue 420-G is a PIEO queue, after completing a packet transmission, Sh-VC scheduler 430-1 searches for the non-empty slot with the minimum timestamp that satisfies the eligibility condition of the Sh-VC scheduler 430-1 and serves the packet.

In one example, based on various example embodiments of scalable deterministic services, the frequency of signaling in response to GD flow allocations and removals may be reduced by increasing and decreasing the allocated service rates by quanta that are larger than the guaranteed rates of the individual flows. In one example, a centralized controller tracks, for each of the GD flow aggregates in the packet network 100, the sum of the requested rates of all of the flows that are part of the GD flow aggregate and the service rate currently allocated at the scalable deterministic services scheduler 400 to the respective GD flow aggregate. It will be appreciated that the latter should not be smaller than the former. In one example, when a new GD traffic flow is about to be added to the network, the centralized controller adds the requested rate of the new GD traffic flow to the requested rate accumulators for all of the links that the new GD traffic flow will traverse and, if any of the requested rate accumulators exceeds the current service rate of the respective GD flow aggregate, the centralized controller increases the service rate by the configured quantum amount. In one example, when an existing GD traffic flow is removed from the network, the centralized controller updates all of the requested rate accumulators for the links along its path and, if any requested rate accumulator drops below the difference between the current service rate and the allocation quantum, the centralized controller reduces the service rate by the configured quantum amount. In both cases, signaling to the nodes along the data path of the removed GD traffic flow is needed only when the service rate changes, thereby reducing the frequency of signaling in response to GD traffic flow allocations and removals.

It will be appreciated that, for various example embodiments of scalable deterministic services, it may be assumed that the routing function precedes the admission of GD traffic flows to the network. In other words, GD traffic flows are added to the network only after all paths from input to output nodes have been identified, with only one path for each input-output pair of nodes. When the allocation of a new GD traffic flow is requested, the new GD traffic flow may be rejected if its allocation requires updating the service rate of at least one of the associated GD flow aggregates and the scalable deterministic services scheduler 400 in front of the network node output that serves the GD flow aggregate does not have a quantum amount left in its spare bandwidth pool. In one example, accommodation of the new GD traffic flow may be supported (and, thus, the rejection of the new GD traffic flow can be avoided) by allowing the GD flow aggregate to increase its service rate only by the amount that is sufficient to accommodate the new flow, if such amount is still available at the link. In one example, accommodation of the new GD traffic flow may be supported (and, thus, the rejection of the new GD traffic flow can be avoided) by routing of the new GD traffic flow over a network path that is different than the single path identified by the underlying routing function for the input-output node pair of the new GD traffic flow.

It will be appreciated that, for various example embodiments of scalable deterministic services, it may be assumed that every network node in the domain of enforcement of delay guarantees serves each GD flow aggregate at a rate that does not exceed its allocated service rate. In one embodiment, if a network node in the data path of a GD flow does not satisfy this assumption, the node immediately downstream compensates the violation by policing the traffic aggregate from the upstream node according to the same LRQ profile expected for the aggregate at the upstream node, and then by dropping all packets that exceed the profile. While the delay guarantees of the GD traffic flows in the GD flow aggregate with the exceeded service rate may no longer be enforced, the delay guarantees of GD traffic flows that merge with the GD flow aggregate at the node immediately downstream remain intact. Additionally, it is noted that, where traffic from upstream nodes is not policed, the enforcement of the expected LRQ profile by the scalable deterministic services scheduler 400 at the node immediately downstream ensures that only the GD traffic flows with common network output that merge at the downstream node can have their delay guarantees violated while the guarantees of GD traffic flows destined for the same output that merge at nodes further downstream remain intact.

It will be appreciated that the scalable deterministic services scheduler 400 may be configured in various other ways (e.g., for supporting GD, CDT, and BE traffic), may be configured to support various other types of traffic (e.g., in addition to or in place of CDT traffic, in addition to or in place of BE traffic, and the like), and the like, as well as various combinations thereof. For example, it will be appreciated that more than one GD traffic queue 420-G may be used, that one or more CDT queues may be used, that fewer or more BE queues 420-B may be used, and the like. For example, it will be appreciated that other types of schedulers may be supported (e.g., a scheduler other than an Sh-VC scheduler (illustratively, Sh-VC scheduler 430-1) may be used for scheduling of GD and CDT traffic, a scheduler other than a strict priority scheduler (illustratively, strict priority scheduler 430-2) may be used for servicing the Sh-VC scheduler 430-1 and the BE queue 420-B, and the like), fewer or more schedulers 430 may be supported, other arrangements of schedulers 430 may be supported, or the like, as well as various combinations thereof. For example, it will be appreciated that higher priority traffic in addition to or other than CDT traffic may be supported, that lower priority traffic in addition to or other than BE traffic may be supported, and the like, as well as various combinations thereof.

In the packet network 100, based on use of scalable deterministic services for supporting communication of GD traffic, each GD traffic flow in the network may be associated with an IDB which quantifies the worst-case delay that packets of the GD traffic flow may ever experience within the packet network 100. For example, the following IDB holds for a flow $f_i$ of guaranteed rate $r_i$ and maximum packet size $L_i$ that traverses M links to cross a network with N outputs (and inputs):

$$IDB_i < (N-2)\frac{L_{max}}{r_i} + \sum_{k=1}^{M}\left(\frac{L_{max}}{C_k} + \frac{L_i}{r_i}\right),$$

where $L_{max}$ is the maximum size of a packet in the entire network and $C_k$ is the capacity of link k in the network path of flow $f_i$. The IDB is obtained by combining a result from the theory of latency-rate servers with the following worst-case assumptions: (1) each time the GD flow aggregate that includes flow $f_i$ merges with another GD flow aggregate destined for the same network output, packets from the two GD flow aggregates arrive at the same time but the packet from the other GD flow aggregate is queued first and (2) in each GD flow aggregate that includes flow $f_i$, the allocated rate of all flows except $f_i$ is negligible, so that the total allocated rate for the GD flow aggregate is only marginally higher than $r_i$.

In the packet network 100, based on use of scalable deterministic services for supporting communication of GD traffic, each GD traffic flow in the network may be associated with an EDB which depends on the service rates allocated to the GD flow aggregates that the GD traffic flow traverses end-to-end and which also depends on the set of other GD traffic flows currently established over the packet network 100. For example, the following effective delay bound holds for a flow $f_i$ of guaranteed rate $r_i$ and maximum packet size $L_i$ that traverses M links to cross a network with N outputs (and inputs):

$$EDB_i \leq \sum_{j=1}^{X_i} \frac{L_j}{R_j} + \sum_{k=1}^{M} \left(\frac{L_{max}}{C_k} + \frac{L_i}{R_k}\right),$$

where $X_i$ is the number of GD flow aggregates destined for the same network output that the GD flow aggregate of flow $f_i$ merges with along its path to the output (it is noted that $X_i$ can be expected to be smaller than the total number of network outputs, because every GD flow aggregate results from the merging of other GD traffic flows and GD flow aggregates at respective upstream nodes), $R_j$ is the service rate of the GD flow aggregate of GD flow $f_i$ at the node where the aggregate of GD flow $f_i$ merges with GD flow aggregate j, and $L_j$ is the maximum size of a packet of GD flow aggregate j. The bound of this EDB equation depends on the current composition of all GD flow aggregates encountered by GD flow $f_i$ and, thus, is subject to variations as flows keep being added to and removed from the network path of GD flow $f_i$. The IDB and EDB delay bounds computed for GD flow $f_1$ in the packet network 100 are depicted in FIG. 5.

Figure 5:
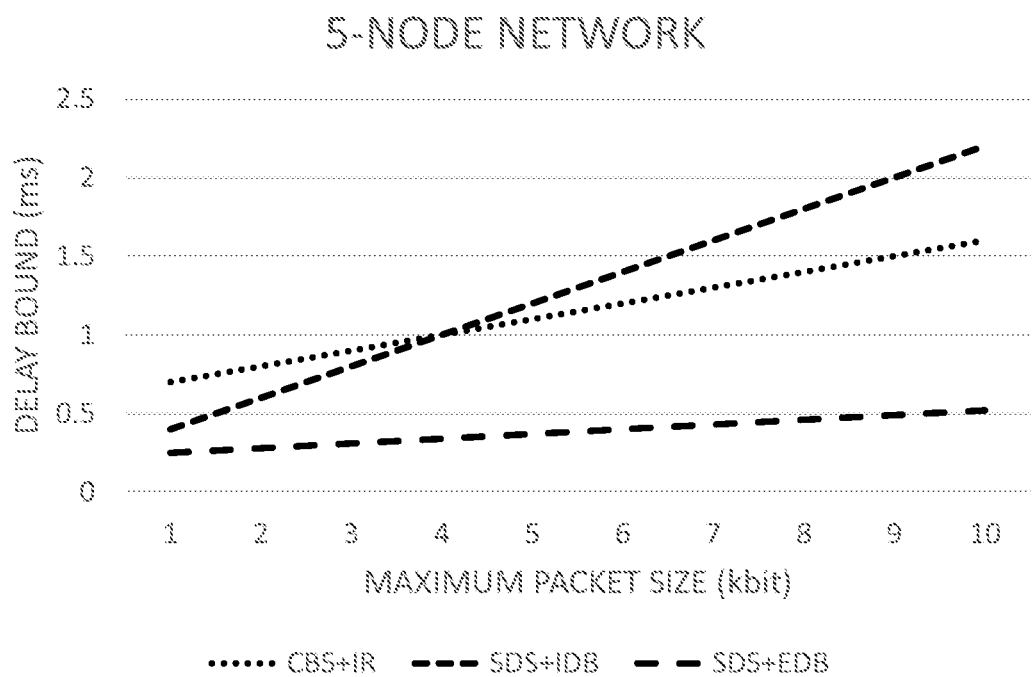
FIG. 5 depicts an example of delay bounds for a traffic flow of the packet network of FIG. 1.

FIG. 5 depicts an example of delay bounds for a traffic flow of the packet network of FIG. 1. More specifically, FIG. 5 depicts the IDB and EDB delay bounds computed for traffic flow 130-1 in the packet network 100. The delay bounds are provided as a function of the maximum size of any GD packet in the packet network 100 of FIG. 1. The IDB and EDB delay bounds computed for traffic flow 130-1 in the packet network 100 (denoted as IDB-SDS and EDB-SDS, respectively) are compared against the delay bound for a combination of the Credit-Based Shaper with per-class queues of IEEE 802.1Qav with the Interleaved Regulator with per-switch-input queues of IEEE 802.1Qcr (the combination is denoted as CBS+IR, 40 Mbps). It is noted that the values are obtained without overprovisioning of the rates allocated to the network queues (e.g., the CBS idle slope rate is 40 Mb/s; the same is true for the service rate of the GD queues that handle two GD traffic flows based on scalable deterministic services). The EDB for SDS is much smaller than the other two bounds, not only because traffic flow 130-1 never merges with other flows on its way to host 110-4, so the left-hand contribution to the bound is null (since $X_i=0$), but, more importantly, because the SDS queuing arrangement eliminates all interference from flows in the same class that are not destined for the same network output (as opposed to CBS+IR). It is noted that even the worst-case SDS bound (i.e., SDS-IDB) does not grow exceedingly higher than the CBS+IR bound.

It will be appreciated that various example embodiments of scalable deterministic services may substantially improve scalability for enforcement of end-to-end delay bounds without degrading performance.

For example, various example embodiments of scalable deterministic services are configured to keep the amount of packet queues and sets of state variables needed per node tied to the size of the network infrastructure (e.g., number of network output ports) rather than to the total number of application instances running at the network edges (e.g., as in per-flow queuing and CBS+IR class-queuing arrangements). For example, in a network with N hosts and an average of M data receivers for delay-sensitive applications running per host, each node in a network based on scalable deterministic services may only need to maintain up to N sets of state variables, as opposed to a network based on a CBS+IR class-queuing arrangement, where each node may need to maintain up to N×M sets of state variables.

For example, various example embodiments of scalable deterministic services are configured such that the allocation and release of network resources no longer needs to be executed at flow granularity. Instead, bandwidth can be allocated and released in batch amounts, while a centralized controller (e.g., an SDN controller or other suitable type of controller) keeps track of the difference between allocated and required amounts. It will be appreciated that this coarser allocation of resources translates into drastic reductions of signaling overhead.

For example, various example embodiments of scalable deterministic services may yield delay bounds that can be significantly smaller than those of the CBS+IR class-queue arrangement.

It will be appreciated that various example embodiments of scalable deterministic services may substantially improve scalability for enforcement of end-to-end delay bounds, without degrading performance, in various other ways.

Figure 6:
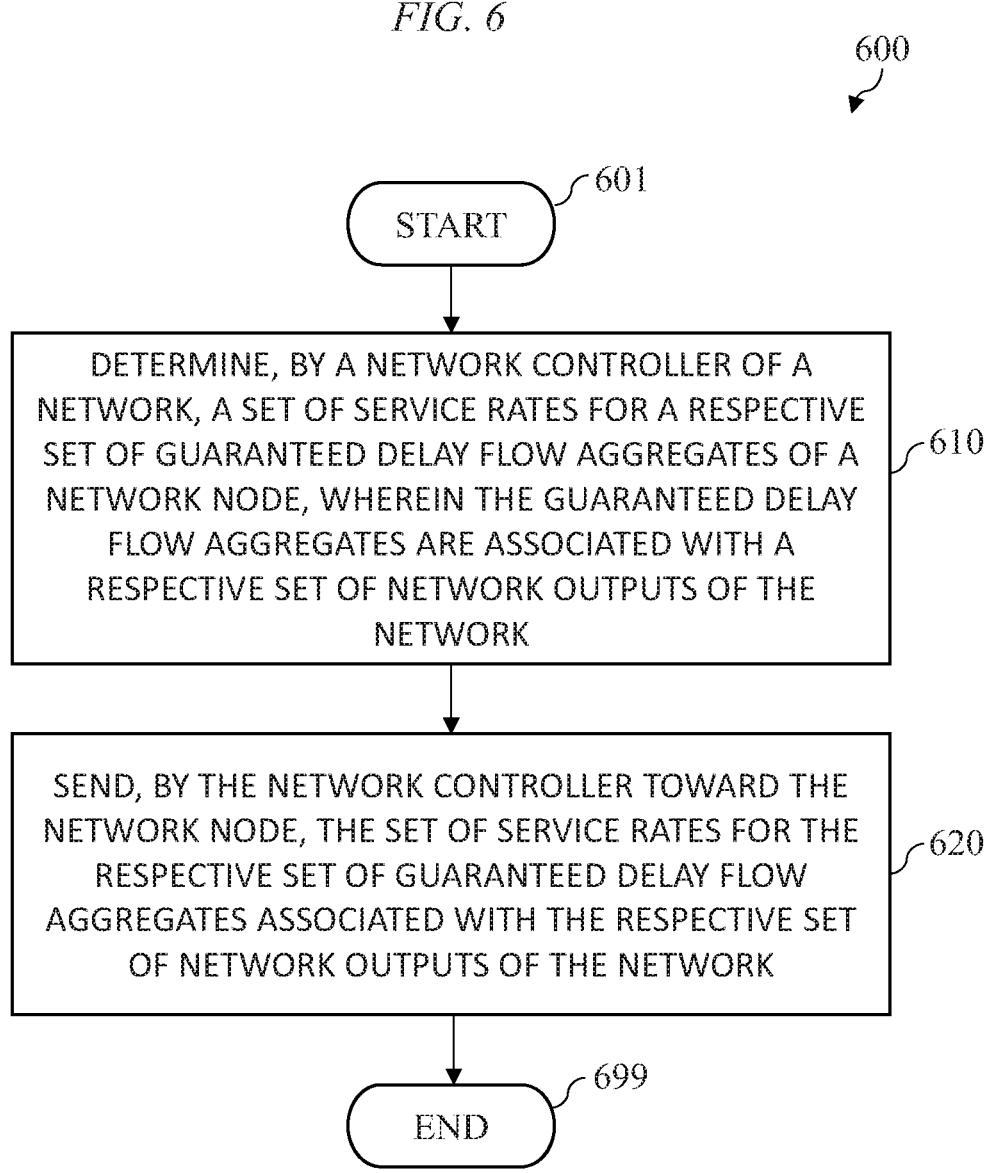
FIG. 6 depicts an example of a method for use by a network controller for supporting scalable deterministic services in packet networks.

FIG. 6 depicts an example of a method for use by a network controller for supporting scalable deterministic services in packet networks. It will be appreciated that, although primarily presented as being performed serially, at least a portion of the functions of method 600 may be performed contemporaneously or in a different order than as presented with respect to FIG. 6. At block 601, method 600 begins. At block 610, determine, by a network controller of a network, a set of service rates for a respective set of guaranteed delay flow aggregates of a network node, wherein the guaranteed delay flow aggregates are associated with a respective set of network outputs of the network. At block 620, send, by the network controller toward the network node, the set of service rates for the respective set of guaranteed delay flow aggregates associated with the respective set of network outputs of the network. At block 699, method 600 ends. It will be appreciated that various aspects of FIGS. 1-4 may be incorporated within the method 600 of FIG. 6.

Figure 7:
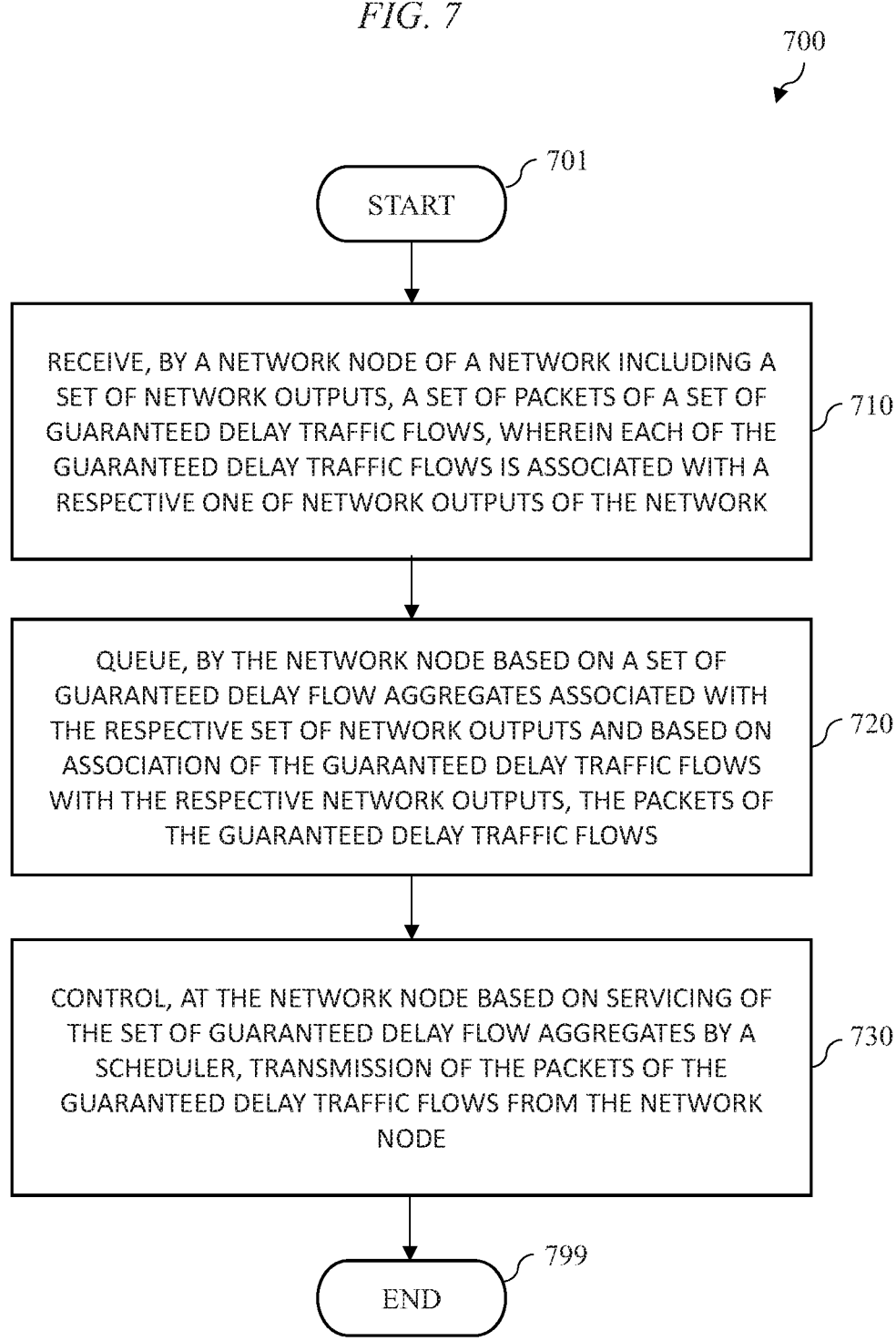
FIG. 7 depicts an example of a method for use by a network node for supporting scalable deterministic services in packet networks.

FIG. 7 depicts an example of a method for use by a network node for supporting scalable deterministic services in packet networks. It will be appreciated that, although primarily presented as being performed serially, at least a portion of the functions of method 700 may be performed contemporaneously or in a different order than as presented with respect to FIG. 7. At block 701, method 700 begins. At block 710, receive, by a network node of a network including a set of network outputs, a set of packets of a set of guaranteed delay traffic flows, wherein each of the guaranteed delay traffic flows is associated with a respective one of network outputs of the network. At block 720, queue, by the network node based on a set of guaranteed delay flow aggregates associated with the respective set of network outputs and based on association of the guaranteed delay traffic flows with the respective network outputs, the packets of the guaranteed delay traffic flows. At block 730, control, at the network node based on servicing of the set of guaranteed delay flow aggregates by a scheduler, transmission of the packets of the guaranteed delay traffic flows from the network node. At block 799, method 700 ends. It will be appreciated that various aspects of FIGS. 1-4 may be incorporated within the method 700 of FIG. 7.

Various example embodiments for supporting scalable deterministic services in packet networks may provide various advantages or potential advantages. For example, various example embodiments for supporting scalable deterministic services in packet networks may be configured to support guaranteed finite end-to-end bounds on flows. For example, various example embodiments for supporting scalable deterministic services in packet networks may be configured to support delay guarantees using only a single traffic class (as opposed to IEEE 802.1Qav, which uses two distinct traffic classes), although it will be appreciated that, in at least some example embodiments, scalable deterministic services in packet networks may be configured to support delay guarantees using multiple traffic classes. For example, various example embodiments for supporting scalable deterministic services in packet networks may be configured to support queuing, scheduling, and bandwidth allocation rules for GD traffic. For example, various example embodiments for supporting scalable deterministic services in packet networks may be configured to keep the amount of packet queues and sets of state variables needed per node tied to the size of the network infrastructure (e.g., number of network output ports) rather than to the total number of application instances running at the network edges. For example, various example embodiments for supporting scalable deterministic services in packet networks may be configured such that the allocation and release of network resources no longer needs to be executed at flow granularity, but, rather, may be allocated and released in batch amounts while a centralized controller tracks the difference between allocated and required amounts. For example, various example embodiments for supporting scalable deterministic services in packet networks may be configured to provide delay bounds that can be significantly smaller than those of various other queuing arrangements. For example, various example embodiments for supporting scalable deterministic services in packet networks may support replacement of 802.1Qbv (or other similar standards) in Industry 4.0 factory networks with wirelessly connected robots (or other similar networks), extension of 802.1Qav capabilities to routed networks with broader geographical scope, enforcement of deterministic delay bounds in data center networks, and so forth. Various example embodiments for supporting scalable deterministic services in packet networks may provide various other advantages or potential advantages.

Figure 8:
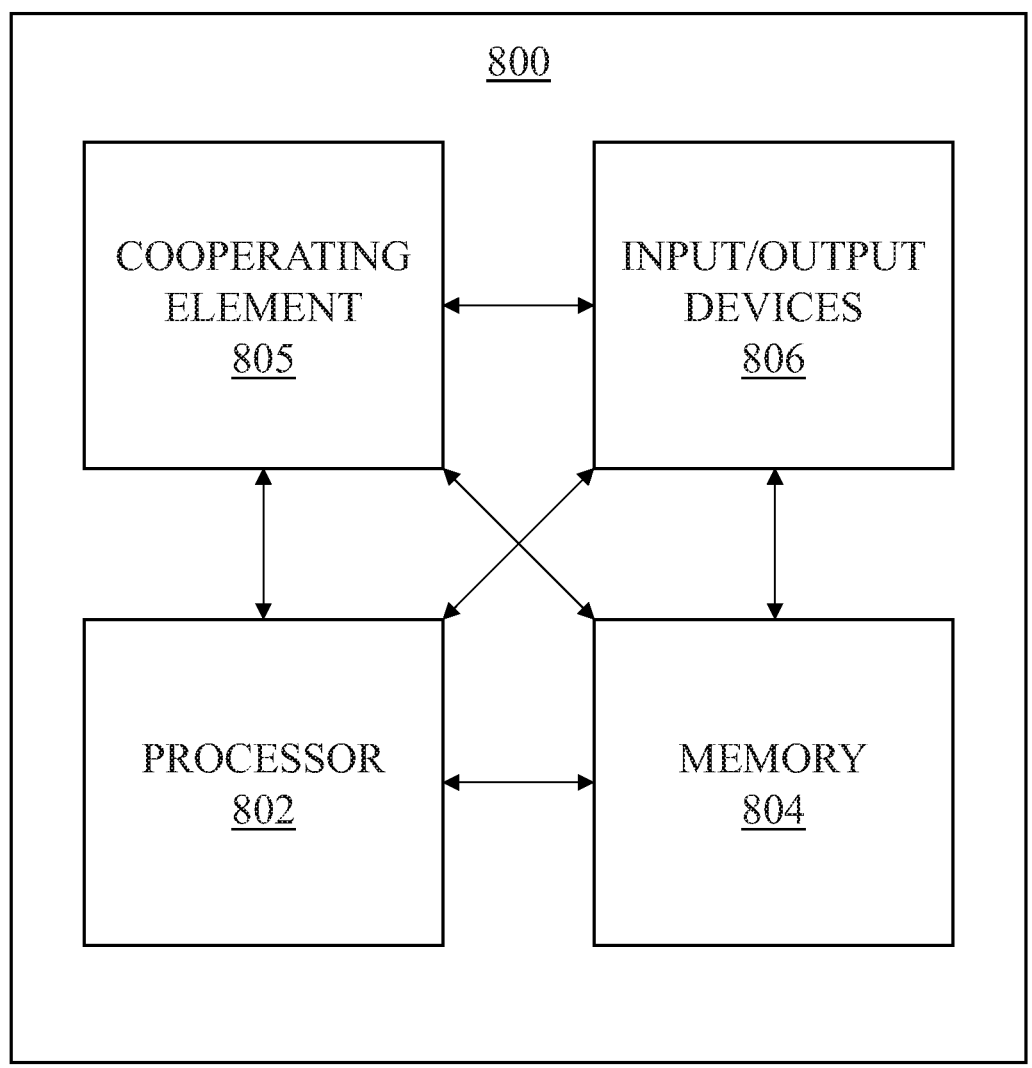
FIG. 8 depicts an example of a computer suitable for use in performing various functions presented herein.

FIG. 8 depicts an example embodiment of a computer suitable for use in performing various functions presented herein.

The computer 800 includes a processor 802 (e.g., a central processing unit, a processor, a processor having a set of processor cores, a processor core of a processor, or the like) and a memory 804 (e.g., a random access memory, a read only memory, or the like). The processor 802 and the memory 804 may be communicatively connected. In at least some embodiments, the computer 800 may include at least one processor and at least one memory including instructions wherein the instructions are configured to, when executed by the at least one processor, cause the apparatus to perform various functions presented herein.

The computer 800 also may include a cooperating element 805. The cooperating element 805 may be a hardware device. The cooperating element 805 may be a process that can be loaded into the memory 804 and executed by the processor 802 to implement various functions presented herein (in which case, for example, the cooperating element 805 (including associated data structures) can be stored on a non-transitory computer-readable storage medium, such as a storage device or other suitable type of storage element (e.g., a magnetic drive, an optical drive, or the like)).

The computer 800 also may include one or more input/output devices 806. The input/output devices 806 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 800 may represent a general architecture and functionality suitable for implementing functional elements described herein, portions of functional elements described herein, or the like, as well as various combinations thereof. For example, computer 800 may provide a general architecture and functionality that is suitable for implementing one or more elements presented herein, such as a host 110 or a portion thereof, a node 120 or a portion thereof, scalable deterministic services scheduler 300 or a portion thereof, scalable deterministic services scheduler 400 or a portion thereof, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various example embodiments which incorporate the teachings presented herein have been shown and described in detail herein, those skilled in the art can readily devise many other varied embodiments that still incorporate these teachings.

What is claimed is:

1. An apparatus, comprising:
at least one processor; and
at least one memory including computer program code;
wherein the at least one memory and the computer program code are configured to, with the at least one processor, cause the apparatus to at least:
receive, by a network node of a network including a set of network outputs including a respective set of output ports interfacing with a set of devices located outside of the network, a set of packets of a set of guaranteed delay traffic flows, wherein each of the guaranteed delay traffic flows is associated with a respective one of the network outputs of the network;
queue, by the network node based on a set of guaranteed delay flow aggregates associated with the respective set of network outputs and based on association of the guaranteed delay traffic flows with the respective network outputs, the packets of the guaranteed delay traffic flows; and
control, at the network node based on servicing of the set of guaranteed delay flow aggregates by a scheduler, transmission of the packets of the guaranteed delay traffic flows from the network node.

2. The apparatus of claim 1, wherein the set of devices located outside of the network comprises at least one of a host device or a network device.

3. The apparatus of claim 1, wherein each of the guaranteed delay flow aggregates has associated therewith a respective service rate, wherein the transmission of the packets of the guaranteed delay traffic flows from the network node is controlled based on the respective service rates associated with the respective guaranteed delay flow aggregates.

4. The apparatus of claim 3, wherein, for each of the guaranteed delay flow aggregates, the respective service rate is at least as large as a sum of a set of service rates allocated to a respective set of guaranteed delay flow aggregates associated with the respective network output at a respective set of network nodes preceding the network node in a network path to the respective network output.

5. The apparatus of claim 1, wherein each of the guaranteed delay flow aggregates has associated therewith a respective timestamp, wherein the transmission of the packets of the guaranteed delay traffic flows from the network node is controlled based on the respective timestamps associated with the respective guaranteed delay flow aggregates.

6. The apparatus of claim 5, wherein, for each of the guaranteed delay flow aggregates, the respective timestamp is associated with one of the packets of one of the guaranteed delay traffic flows associated with the respective guaranteed delay flow aggregate and is computed based on at least one of a local time at the network node, a timestamp of a previously arrived packet of the respective guaranteed delay flow aggregate, a size of the packet of the one of the guaranteed delay traffic flows, or a service rate allocated to the guaranteed delay flow aggregate.

7. The apparatus of claim 1, wherein the transmission of the packets of the guaranteed delay traffic flows from the network node is controlled based on a set of guaranteed delay queues associated with the respective guaranteed delay flow aggregates.

8. The apparatus of claim 7, wherein the transmission of the packets of the guaranteed delay traffic flows from the network node is controlled based on a set of timestamps associated with the respective guaranteed delay queues.

9. The apparatus of claim 8, wherein, for at least one of the timestamps, the timestamp is a per-packet timestamp associated with one of the packets, wherein the per-packet timestamp is determined for the one of the packets based on arrival of the one of the packets to the respective guaranteed delay queue and is associated with the respective guaranteed delay queue based on the one of the packets becoming a head packet of the respective guaranteed delay queue.

10. The apparatus of claim 9, wherein the per-packet timestamp is computed based on a timestamp of a previous tail packet of the respective guaranteed delay queue, a size of the one of the packets, and a service rate of the respective guaranteed delay queue.

11. The apparatus of claim 8, wherein, for at least one of the timestamps, the timestamp is a per-queue timestamp associated with the respective guaranteed delay queue, wherein the per-queue timestamp is determined for the respective guaranteed delay queue based on one of the packets reaching a respective head position of the respective guaranteed delay queue.

12. The apparatus of claim 11, wherein the per-queue timestamp is computed based on a previous per-queue timestamp associated with the respective guaranteed delay queue, a size of the one of the packets, and a service rate of the respective guaranteed delay queue.

13. The apparatus of claim 8, wherein, to control transmission of the packets of the guaranteed delay traffic flows from the network node, the at least one memory and the computer program code are configured to, with the at least one processor, cause the apparatus to at least:
select one of the guaranteed delay queues for which the respective timestamp is a lowest timestamp satisfying an eligibility condition.

14. The apparatus of claim 13, wherein the eligibility condition is based on a size of a head packet of the one of the guaranteed delay queues, a service rate allocated to the respective guaranteed delay flow aggregate of the one of the guaranteed delay queues, and the respective timestamp associated with the one of the guaranteed delay queues.

15. The apparatus of claim 1, wherein the transmission of the packets of the guaranteed delay traffic flows from the network node is controlled based on a guaranteed delay queue associated with the guaranteed delay flow aggregates.

16. The apparatus of claim 15, wherein the transmission of the packets of the guaranteed delay traffic flows from the network node is controlled based on a set of timestamps associated with the respective packets of the guaranteed delay traffic flows.

17. The apparatus of claim 16, wherein, for at least one of the packets, the respective timestamp for the packet is determined based on at least one of a timestamp of a previously arrived packet of one of the guaranteed delay flow aggregates with which the packet is associated, a size of the packet, or a service rate of the one of the guaranteed delay flow aggregates with which the packet is associated.

18. The apparatus of claim 16, wherein, to control transmission of the packets of the guaranteed delay traffic flows from the network node, the at least one memory and the computer program code are configured to, with the at least one processor, cause the apparatus to at least:
select one of the packets of the guaranteed delay traffic flows for which the respective timestamp is a lowest timestamp satisfying an eligibility condition.

19. The apparatus of claim 18, wherein the eligibility condition is based on a size of the one of the packets, a service rate allocated to the respective guaranteed delay flow aggregate of the respective guaranteed delay flow of the one of the packets, and the respective timestamp associated with the packet.

20. A method, comprising:
receiving, by a network node of a network including a set of network outputs including a respective set of output ports interfacing with a set of devices located outside of the network, a set of packets of a set of guaranteed delay traffic flows, wherein each of the guaranteed delay traffic flows is associated with a respective one of the network outputs of the network;
queuing, by the network node based on a set of guaranteed delay flow aggregates associated with the respective set of network outputs and based on association of the guaranteed delay traffic flows with the respective network outputs, the packets of the guaranteed delay traffic flows; and
controlling, at the network node based on servicing of the set of guaranteed delay flow aggregates by a scheduler, transmission of the packets of the guaranteed delay traffic flows from the network node.

\* \* \* \* \*